(12) United States Patent
Sher et al.

(10) Patent No.: US 7,342,079 B2
(45) Date of Patent: Mar. 11, 2008

(54) POLYMERIZATION PROCESS AND REACTOR SYSTEM

(75) Inventors: Jaimes Sher, Albuquerque, NM (US); Robert O. Hagerty, La Porte, TX (US); Kevin B. Stavens, Seabrook, TX (US); Randall B. Laird, Pasadena, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/629,413

(22) PCT Filed: Jun. 20, 2005

(86) PCT No.: PCT/US2005/021723

§ 371 (c)(1),
(2), (4) Date: Dec. 13, 2006

(87) PCT Pub. No.: WO2006/009981

PCT Pub. Date: Jan. 26, 2006

(65) Prior Publication Data

US 2007/0219325 A1    Sep. 20, 2007

Related U.S. Application Data

(60) Provisional application No. 60/581,600, filed on Jun. 21, 2004.

(51) Int. Cl.
*C08F 6/00* (2006.01)
*C08F 2/14* (2006.01)

(52) U.S. Cl. .................. 526/206; 528/482; 528/501; 528/503

(58) Field of Classification Search ................ 526/206; 528/482, 501, 503
See application file for complete search history.

(56) References Cited

U.S. PATENT DOCUMENTS

| | | | |
|---|---|---|---|
| 2,534,698 A | * | 12/1950 | Calfee et al. ............... 526/206 |
| 3,056,771 A | | 10/1962 | Aldridge et al. |
| 3,470,143 A | | 9/1969 | Schrage et al. |
| 4,217,431 A | | 8/1980 | Zacher et al. |
| 4,433,121 A | | 2/1984 | Kabu et al. |
| 4,588,790 A | | 5/1986 | Jenkins, III et al. |
| 5,352,749 A | | 10/1994 | DeChellis et al. |

(Continued)

FOREIGN PATENT DOCUMENTS

EP    0 089 691    9/1983

(Continued)

OTHER PUBLICATIONS

U.S. Appl. No. 11/285,264, filed Nov. 22, 2005, Iaccino et al.

(Continued)

*Primary Examiner*—Fred Teskin

(57) ABSTRACT

This invention is directed to processes for making polymer in the presence of a hydrofluorocarbon, and for the recovery of polymer substantially free of dissolved hydrocarbons and hydrofluorocarbons. The processes provided enables polymerization processes to be practiced with minimal fouling in the reaction system, and with the recovery of the hydrofluorocarbon and monomers for reuse in the reactor. The process of the invention utilizes a reactor system, a recovery system and a flare system that minimize environmental emissions of hydrocarbons, hydrofluorocarbons and associated decomposition products.

60 Claims, 5 Drawing Sheets

U.S. PATENT DOCUMENTS

| | | | |
|---|---|---|---|
| 5,405,922 A | 4/1995 | DeChellis et al. | |
| 5,769,927 A | 6/1998 | Gottschlich et al. | |
| 6,271,319 B1 | 8/2001 | Baker et al. | |
| 6,313,236 B1 * | 11/2001 | Ford et al. | 526/74 |
| 6,346,587 B1 * | 2/2002 | Kruger et al. | 526/206 |

FOREIGN PATENT DOCUMENTS

| | | |
|---|---|---|
| EP | 1 323 746 | 7/2003 |
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

"Adsorption of 1,1,1,2-Tetrafluoroethane on Activated Charcoal," Basavaraj S. Akkimaradi et al., J. Chem. Eng. Data 2001, 46, 417-422.

* cited by examiner

POLYMERIZATION PROCESS AND REACTOR SYSTEM

PRIORITY CLAIM

This application is the national phase entry into the United States Patent Office of international application number PCT/US2005/021723 filed Jun. 20, 2005, which claims benefit of and priority to U.S. Provisional Patent Application Ser. No. 60/581,600 filed Jun. 21, 2004.

FIELD OF THE INVENTION

This invention relates to a polymerization process and a reactor system for making a polymer product. In particular, this invention relates to a polymerization process using a hydrofluorocarbon, and a reactor system providing for the recovery of the polymer product and the hydrofluorocarbon.

BACKGROUND OF THE INVENTION

Polymerization generally involves polymerization of one or more monomers to make a polymeric product. The polymerization reaction can be carried out using a wide variety of reactors, catalysts, and a wide variety of monomer feeds. Often, liquids, diluents or solvents are used in these polymerization reaction processes for various reasons such as to increase the efficiency of the polymerization reaction and recovery of polymer product.

An example of a polymerization process that incorporates the use of a dilutent is shown in U.S. Pat. No. 3,470,143 (Schrage et al.). Specifically, the Schrage patent discloses a laboratory scale polymerization reaction that incorporates the use of an organic fluorinated carbon compound as the dilutent.

Polymer production at commercial scale typically results in the production of a polymer product having significant amounts of entrained hydrocarbon material such as unreacted monomer, as well as various levels of liquids, solvents, diluents, catalysts and other by-products and/or non-reactive components. Separation and recovery of the polymer product from such a mixture of components typically involves passing the polymer product withdrawn from the polymerization reactor into purge bins, with nitrogen typically introduced into the purge bin to remove the undesirable materials from the polymer product. Conventionally, the nitrogen and undesirable material are vented or sent to a flare system as a waste stream.

U.S. Pat. No. 5,769,927 (Gottschlich et al.) discloses a process for treating material that is to be vented or purged from a polymer manufacturing operation using a three step separation technique. The technique includes condensation, flash evaporation and membrane separation to remove components such as ethylene, propylene and nitrogen.

U.S. Pat. No. 6,271,319 (Baker et al.) discloses a polypropylene manufacturing process that includes using a gas separation membrane to separate propylene from propane in a reactor vent stream. The separated propylene is circulated back to the polymerization reactor as feed.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature.

There are needs for improved polymerization processes, for example reducing reactor fouling at commercial scale, enhancing the commercial grade slate of polymer products produced from a given process, increasing polymer production capacity without significant investment where these process improvements necessitate more efficient recovery systems that provide environmental benefits as well as cost reductions. Therefore, depending on the various components used in polymerization processes improvements, polymer product recovery and reactor systems for recovering reusable materials and lowering emissions is needed, particularly in light of ever changing environmental constraints that continue to be imposed in the chemical manufacturing industry.

SUMMARY OF THE INVENTION

The invention provides a process for making a polymer product and a polymer reactor system where a hydrofluorocarbon is used in the process. The invention further provides for a reactor system for use with a hydrofluorocarbon, and for recovery of the hydrofluorocarbon and other hydrocarbons or compounds that are typically reusable in a polymerization process. Also, this invention provides for any type of polymerization process and polymer product recovery and hydrocarbon recovery processes that couple together the benefits of reduced reactor fouling and efficient polymer product recovery with low emissions.

According to one aspect of the invention, there is provided a process for polymerizing one or more monomer(s) in a reactor system, the reactor system comprising a reactor and a flare system, the process comprising the steps of: a) introducing a catalyst system and the one or more hydrocarbon monomers, in the presence of a hydrofluorocarbon, to the reactor, producing polymer and hydrocarbon by-products; b) recovering at least a portion of the hydrocarbon by-products from the hydrofluorocarbon and polymer as a waste stream; and c) sending at least a portion of the waste stream to the flare system. In yet another embodiment, the invention is directed to a process for polymerizing one or more monomer(s) in a reactor system, the reactor system comprising a reactor and a flare system, the process comprising the steps of: a) introducing a catalyst system and the one or more monomers, in the presence of a hydrofluorocarbon, to the reactor producing a polymer product and by-products, the by-products comprising a portion of the hydrofluorocarbon; b) removing a portion of the hydrofluorocarbon from the by-products prior to the remaining by-products entering the flare system. In another embodiment, the by-products further comprise nitrogen and one or more of the monomer(s), wherein in addition to removal of a portion of the hydrofluorocarbon, portions of the nitrogen and/or one or more monomer(s) are removed prior to the remaining by-products entering the flare system.

According to another aspect of the invention, there is provided a process for polymerizing one or more monomer(s) in a reactor system, the reactor system comprising a reactor and a flare system. The process comprises mixing together a catalyst system, the one or more monomers and a hydrofluorocarbon in the reactor to produce polymer. There is recovered from the mixture a plurality of streams, including a hydrofluorocarbon containing stream, a polymer product stream and a waste stream. At least a portion of the waste stream is sent to the flare system.

In another embodiment if the invention, there is provided a polymerization process that comprises forming a polymer in the presence of a hydrofluorocarbon. A majority of the polymer is recovered in a polymer product stream and a majority of the hydrofluorocarbon in a purge stream. The purge stream is separated into a plurality of streams including a hydrofluorocarbon containing stream and a waste stream. At least a portion of the waste stream is sent to a flare stream.

In another embodiment, the process of the invention comprises separating hydrofluorocarbon from a polymer and recovering the separated hydrofluorocarbon in a purge stream. The purge stream is separated into a plurality of streams including a hydrofluorocarbon containing stream and a waste stream, and at least a portion of the waste stream is sent to a flare system.

In yet another embodiment, there is provided a polymerization process in which at least one monomer is polymerized to form polymer in a mixture containing hydrofluorocarbon. A plurality of streams, including a waste stream, is recovered from the mixture, and at least a portion of the waste stream is sent to a flare system.

In one embodiment, the waste stream is sent to the flare system at a hydrofluorocarbon flow rate to unit production flow rate of not greater than 0.1:1. Preferably, the waste stream is sent to the flare system at a hydrofluorocarbon flow rate to unit production flow rate of not greater than 0.01:1, more preferably not greater than 0.001:1.

In another embodiment, the mixture is purged with a nitrogen stream and then the plurality of streams is recovered. Preferably, the plurality of recovered streams includes a nitrogen containing stream. More preferably, the nitrogen containing stream contains a majority of the nitrogen used to purge the polymer product.

In one embodiment, the waste stream is sent to the flare system at a nitrogen flow rate that is not greater than 6% of unit production rate. Preferably, the waste stream is sent to the flare system at a nitrogen flow rate that is not greater than 3%, more preferably not greater than 1%, and most preferably not greater than 0.5% unit production rate.

A plurality of streams can be recovered from the product mixture through one or more separation systems. Examples of such systems include, but are not limited to compression, flashing, cooling, condensation, distillation, selective barrier separation or a combination thereof. Preferably, the plurality of streams is recovered through condensation and selective barrier separation.

The polymerization process can be carried out in any variety of modes. For example, the polymerization process can be carried out as a solution process, gas phase process, slurry phase process, medium pressure process, high pressure process or a combination thereof.

The recovered polymer product stream is typically low in contaminants. In one embodiment, the recovered polymer product stream contains not greater than 100 wppm total hydrofluorocarbon, based on total weight of the recovered polymer product stream.

BRIEF DESCRIPTION OF THE DRAWINGS

The attached Figures represent various aspects of the invention. The Figures are intended to be viewed as merely examples of specific embodiments within the scope of the overall invention as claimed.

DETAILED DESCRIPTION OF THE INVENTION

I. Introduction

Figure 1:
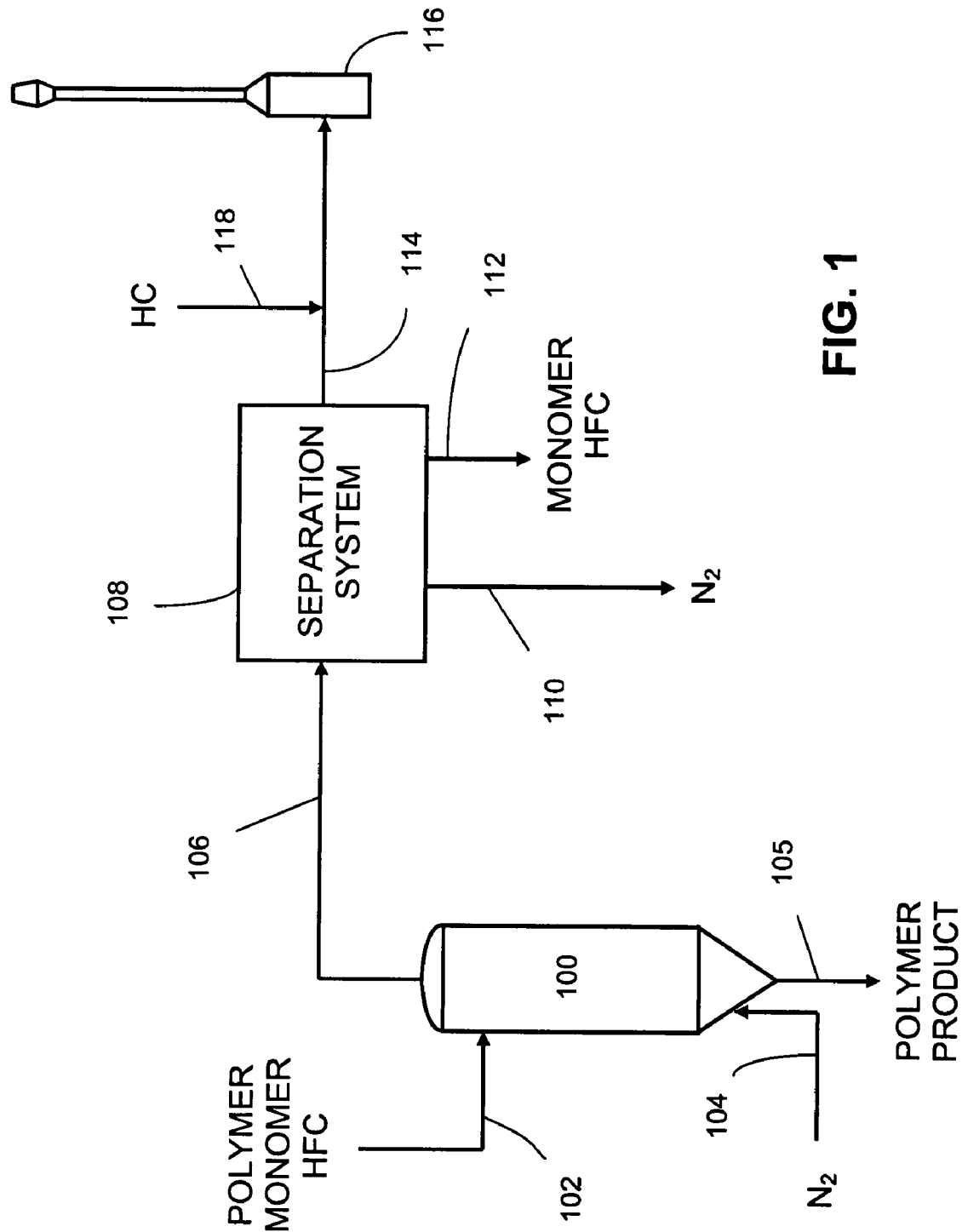
FIG. 1 is a generic flow diagram of the polymer recovery system of this invention.

This invention is directed to a process for polymerizing one or more monomer(s) in the presence of a catalyst system and a hydrofluorocarbon in a reactor, and in combination with a separation system for removing various compounds from the process. The separation system is designed in one embodiment for preventing substantially all or all of the hydrofluorocarbon from being vented to the atmosphere or flared in the flare system. One issue concerning venting or flaring of the hydrofluorocarbons is that the hydrofluorocarbon can form acid materials, for example, hydrogen fluoride (HF). These acid materials result in corrosion or environmental contamination. Therefore, while the invention relates to a polymerization process using hydrofluorocarbons, without the recognition for avoiding venting or flaring of the hydrofluorocarbon, the benefits of the process of the invention would not be commercially viable.

II. Making and Recovering Polymer

This invention is directed to processes for making polymer and recovering a polymer product with minimal fouling, thus resulting in improved operation efficiency, with low loss of heat transfer and extended run periods. Also, the invention provides for the production of polymers not typically capable of being produced in a given process thereby expanding the commercial grade slate from a particular process.

In addition to the production and recovery of polymer from the process, the invention provides for higher recovery of hydrocarbons that are recovered along with the polymer. Such hydrocarbons include non-polymerized materials, for example liquids, diluents, solvents, and unreacted monomers. Many of these non-polymerized materials are recovered at high efficiency and reused in the polymerization process. Additionally, the recovery process further provides the benefit of reducing potential corrosion and other environmental problems relating to the venting or flaring of hydrocarbon waste streams; a waste stream being any stream that contains components removed from the reaction process and not reused in that process. Such waste streams includes those streams that are removed from the reaction process by venting into the atmosphere or flaring.

One general embodiment of the invention is accomplished by forming a polymer in the presence of diluent material effective in reducing reactor fouling, such as hydrofluorocarbon (HFC). The HFC diluent is separated from the polymer along with hydrocarbon by-products from the reaction process, and at least a portion of the undesirable hydrocarbon by-products is removed from the reaction system as a waste stream.

A particularly effective manner of removing or venting the purge stream is to flare or burn the waste stream.

Preferably, the waste stream is low in diluent and non-combustible material to reduce environmental contamination. The compounds in the waste stream that are vented have a lower flow rate relative to the unit production flow rate compared to that of conventional processes. This lower flow rate means that less environmentally contaminating materials will leave the reaction system, and that a greater amount of materials can be recovered and reused in the polymerization process.

III. Monomers

The processes described herein may be used in any type of polymerization process employing one or more monomers. Typical monomers include unsaturated hydrocarbons having from 2 to 30 carbon atoms, preferably 2 to 12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly preferred monomers include one or more of ethylene, propylene, butene-1, pentene-1,4-methyl-pentene-1, hexene-1, octene-1, decene-1,3-methyl-pentene-1, norbornene, norbornadiene, 3,5,5-trimethyl-1-hexene, 5-ethyl-1-nonene, vinyl norbornene, ethylidene norbornene monomers.

Preferred cyclic containing monomers include aromatic-group-containing monomers containing up to 30 carbon atoms and non aromatic cyclic group containing monomers containing up to 30 carbon atoms. Suitable aromatic-group-containing monomers comprise at least one aromatic structure, preferably from one to three, more preferably a phenyl, indenyl, fluorenyl, or naphthyl moiety.

The aromatic group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment the polymer produced herein is an ethylene homopolymer or copolymer. In a particularly preferred embodiment, the process of this invention relates to the polymerization of ethylene and one or more $C_4$ to $C_{20}$ linear, branched or cyclic monomers, preferably $C_4$ to $C_{12}$ linear or branched alpha-olefins. In a preferred embodiment, the comonomer comprises at least one comonomer having from 3 to 8 carbon atoms, preferably 4 to 8 carbon atoms. Particularly, the comonomers are propylene, butene-1,4-methyl-pentene-1,3-methyl-pentene-1, hexene-1 and octene-1, the most preferred being hexene-1, butene-1 and or octene-1.

In a preferred embodiment the polymer produced herein is a propylene homopolymer or copolymer. In a particularly preferred embodiment, the process of the invention relates to the polymerization of propylene and one or more $C_4$ to $C_{20}$ linear, branched or cyclic monomers, preferably $C_4$ to $C_{12}$ linear or branched alpha-olefins. In a preferred embodiment, the comonomer comprises at least one comonomer having from 2 to 8 carbon atoms, preferably 4 to 8 carbon atoms, preferably ethylene, butene-1, pentene, hexene-1, heptene-1, octene-1, nonene-1, decene-1, dodecene-1,4-methyl-pentene-1,3-methyl pentene-1,3,5,5-trimethyl-hexene-1, and the like. In some embodiments, ethylene is present at 5 mol % or less.

In another embodiment the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a preferred embodiment, the monomer is present in the polymer at 50 mole % to 99.9 mole %, more preferably 70 to 98 mole %, and more preferably 80 to 95 mole %. Comonomer(s) are present in the polymer at 0.1 mole % to 50 mole %, based upon the moles of all monomers present, more preferably 2 to 30 mole %, more preferably 5 to 20 mole %.

In another embodiment, the polymer produced herein comprises:

a first olefin monomer present at from 40 to 100 mole %, preferably 50 to 100 mole %, more preferably 60 to 100 mole %, and a second olefin monomer (a comonomer) present at from 0 to 60 mole %, preferably 0 to 30 mole %, more preferably 0 to 10 mole %, and optionally a third olefin monomer present at from 0 to 10 mole %, more preferably from 0 to 5 mole %, more preferably 0 to 3 mole %.

In a preferred embodiment the first olefin monomer comprises one or more of any $C_3$ to $C_8$ linear, branched or cyclic alpha-olefins, including propylene, 1-butene, (and all isomers thereof), 1-pentene (and all isomers thereof), 1-hexene (and all isomers thereof), 1-heptene (and all isomers thereof), and 1-octene (and all isomers thereof). Preferred monomers include propylene, 1-butene, 1-hexene, 1-octene, and the like.

In a preferred embodiment the second olefin monomer comprises one or more of any $C_2$ to $C_{40}$ linear, branched or cyclic alpha-olefins, including ethylene, propylene, 1-butene, 1-pentene, 1-hexene, 1-heptene, and 1-octene, 1-nonene, 1-decene, 1-undecene, 1-dodecene, 1-hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a preferred embodiment the third olefin monomer comprises one or more of any $C_2$ to $C_{40}$ linear, branched or cyclic alpha-olefins, including butadiene, hexadiene, heptadiene, pentadiene, octadiene, nonadiene, decadiene, dodecadiene, styrene, 3,5,5-trimethylhexene-1,3-methylpentene-1, 4-methylpentene-1, cyclopentadiene, and cyclohexene.

IV. Liquid, Diluent, Solvent, Solution

The diluents used in this invention are beneficial in producing highly useful polymer products. Use of the diluents can also provide polymer processes having reduced fouling, higher overall efficiencies and/or reduced environmental emissions. The diluents of the invention are preferably compositions added to the reaction process that reduce the concentration of one or more active materials in the process to achieve the desired and beneficial effect. Preferably, the diluent is a hydrocarbon having little to no solvent power. More preferably, the diluent is a halogen containing compound, most preferably a fluorinated hydrocarbon compound, and preferably a compound having little to no solvent power with respect to the polymer product. The fluorinated hydrocarbons may be used individually or as mixtures, and can be included in a mixture with non-fluorinated hydrocarbon diluents if desired.

According to this invention, fluorinated hydrocarbons are compounds having at least one carbon atom and at least one fluorine atom. The fluorinated hydrocarbon can be a perfluorinated hydrocarbon or the fluorinated hydrocarbon can optionally include one or more hydrogen atom(s). A perfluorinated hydrocarbon is a fluorocarbon in which the hydrogen directly attached to the carbon atom(s) is completely replaced by fluorine. See *Hawley's Condensed Chemical Dictionary*, Thirteenth Edition, Van Nostrand Renhold, 1997. Examples of preferred perfluorocarbons include linear branched or cyclic, $C_1$ to $C_{40}$, preferably $C_1$ to $C_{20}$, more preferably $C_1$ to $C_{10}$, and most preferably $C_1$ to $C_6$ perfluoroalkanes.

In one embodiment, the fluorinated hydrocarbons are represented by the formula:

$$C_xH_yF_z \quad (XII)$$

wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal to 0 and z is an integer and at least one, more preferably, y and z are integers and at least one. In a preferred embodiment z is 2 or more.

Examples of hydrofluorocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; ,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane;

fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred HFC's include difluoromethane, trifluoromethane, 1,1-difluoroethane, 1,1,1-trifluoroethane, fluoromethane, and 1,1,1,2-tetrafluoroethane.

In other embodiments, one or more HFCs are used in combination with another diluent or mixtures of diluents. Suitable additional diluents include hydrocarbons, especially hexanes and heptanes, halogenated hydrocarbons, especially chlorinated hydrocarbons and the like. Specific examples include but are not limited to propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and the halogenated versions of all of the above, preferably the chlorinated versions of the above, more preferably fluorinated versions of all of the above. Brominated versions of the above are also useful. Specific examples include, methyl chloride, methylene chloride, ethyl chloride, propyl chloride, butyl chloride, chloroform and the like.

In one embodiment the HFC is used in combination with methyl chloride. Additional embodiments include using the HFC in combination with hexanes or methyl chloride and hexanes. In another embodiment the HFCs are used in combination with one or more gases inert to the polymerization such as carbon dioxide, nitrogen, argon, neon, helium, krypton, zenon, and/or other inert gases. Preferred gases include carbon dioxide and/or nitrogen.

In another embodiment, the HFCs are used in combination with one or more nitrated alkanes, including $C_1$ to $C_{40}$, preferably $C_1$ to $C_{20}$, more preferably $C_1$ to $C_{12}$, and most preferably $C_1$ to $C_8$, alkanes, including nitrated linear, cyclic or branched alkanes. Preferred nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFCs blended with nitromethane.

The HFC is typically present at 1 to 100 volume % based upon the total volume of the diluents, alternatively between 5 and 100 volume %, alternatively between 10 and 100 volume %, alternatively between 15 and 100 volume %, alternatively between 20 and 100 volume %, alternatively between 25 and 100 volume %, alternatively between 30 and 100 volume %, alternatively between 35 and 100 volume %, alternatively between 40 and 100 volume %, alternatively between 45 and 100 volume %, alternatively between 50 and 100 volume %, alternatively between 55 and 100 volume %, alternatively between 60 and 100 volume %, alternatively between 65 and 100 volume %, alternatively between 70 and 100 volume %, alternatively between 75 and 100 volume %, alternatively between 80 and 100 volume %, alternatively between 85 and 100 volume %, alternatively between 90 and 100 volume %, alternatively between 95 and 100 volume %, alternatively between 97 and 100 volume %, alternatively between 98 and 100 volume %, and alternatively between 99 and 100 volume %. In another preferred embodiment the HFC is selected from the group consisting of difluoromethane, trifluoromethane, 1,1-difluoroethane, 1,1,1-trifluoroethane, and 1,1,1,2-tetrafluoroethane and mixtures thereof.

In another preferred embodiment, the fluorinated hydrocarbon used in the process of the invention is selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorinated hydrocarbons useful in the process of the invention include HFC-236fa having the chemical name 1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentaine and/or HFC-365mfc, all of which are commercially available fluorinated hydrocarbons.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon and preferably the hydrofluorocarbon is present at more than 1 volume %, based upon the total volume of the perfluorocarbon and the hydrofluorocarbon present in the reactor, (with the balance being made up by the perfluorocarbon) preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons of the invention have a molecular weight (MW) greater than 90 a.m.u., preferably greater than 95 a.m.u, and more preferably greater than 100 a.m.u. In another embodiment, the fluorinated hydrocarbons of the invention have a MW greater than 120 a.m.u, preferably greater than 125 a.m.u, even more preferably greater than 130 a.m.u, and most preferably greater than 140 a.m.u. In still another embodiment, the fluorinated hydrocarbons of the invention have a MW greater than 125 a.m.u, preferably greater than 130 a.m.u, even more preferably greater than 135 a.m.u, and most preferably greater than 150 a.m.u. In another embodiment, the fluorinated hydrocarbons of the invention have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons of the invention have a MW in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons of the invention have normal boiling point in the range of from about $-50°$ C. up to the polymerization temperature, preferably a polymerization temperature of about 85° C., preferably the normal boiling point of the fluorinated hydrocarbons is in the range of from $-40°$ C. to about 70° C., more preferably from about $-130°$ C. to about 60° C., and most preferably from about $-30°$ C. to about 55° C. In an embodiment, the fluorinated hydrocarbons of the invention have normal boiling point greater than $-30°$ C., preferably greater than $-30°$ C. to less than $-10°$ C. In a further embodiment, the fluorinated hydrocarbons of the invention have normal boiling point greater than $-5°$ C., preferably greater than $-5°$ C. to less than $-20°$ C. In one embodiment, the fluorinated hydrocarbons of the invention have normal boiling point greater than 30° C., preferably greater than 30° C. to about 60° C.

In another embodiment, the fluorinated hydrocarbons of the invention have a liquid density @ 20° C. (g/cc) greater than 1 g/cc, preferably greater than 1.10, and most preferably greater than 1.20 g/cc. In one embodiment, the fluorinated hydrocarbons of the invention have a liquid density @ 20° C. (g/cc) greater than 1.20 g/cc, preferably greater than 1.25, and most preferably greater than 1.30 g/cc. In an embodiment, the fluorinated hydrocarbons of the invention have a liquid density @ 20° C. (g/cc) greater than 1.30 g/cc, preferably greater than 1.40, and most preferably greater than 1.50 g/cc.

In one embodiment, the fluorinated hydrocarbons of the invention have a ΔH Vaporization as measured by standard calorimetry techniques in the range between 100 kJ/kg to less than 300 kJ/kg, preferably in the range of from 110 kJ/kg to less than 300 kJ/kg, and most preferably in the range of from 120 kJ/kg to less than 300 kJ/kg.

In another preferred embodiment, the fluorinated hydrocarbons of the invention have any combination of two or more of the aforementioned MW, normal boiling point, ΔH Vaporization, and liquid density values and ranges. In a preferred embodiment, the fluorinated hydrocarbons useful in the process of the invention have a MW greater than 90 a.m.u, preferably greater than 100 a.m.u, and a liquid density greater than 1.00 g/cc, preferably greater than 1.20 g/cc. In yet another preferred embodiment, the fluorinated hydrocarbons useful in the process of the invention have a liquid density greater than 1.10 g/cc, preferably greater than 1.20 g/cc, and a normal boiling point greater than $-50°$ C., preferably greater than $-30°$ C. up to the polymerization temperature of the process, which is as high as 100° C., preferably less than 85° C., and more preferably less than 75° C., and most preferably less than 60° C. In one embodiment, the fluorinated hydrocarbons useful in the process of the invention have a MW greater than 90 a.m.u, preferably greater than 100 a.m.u, and a ΔH Vaporization in the range of from 100 kj/kg to less than 300 kj/kg, and optionally a liquid density greater than 1.00 g/cc, preferably greater than 1.20 g/cc. In yet another embodiment, the fluorinated hydrocarbons useful in the process of the invention have a liquid density greater than 1.10 g/cc, preferably greater than 1.20 g/cc, and a normal boiling point greater than $-50°$ C., preferably greater than $-30°$ C. up to the polymerization temperature of the process, which is as high as 100° C., preferably less than 85° C., and more preferably less than 75° C., and most preferably less than 60° C., and optionally a ΔH Vaporization in the range of from 120 kj/kg to less than 250 kj/kg.

In yet another embodiment, one or more fluorinated hydrocarbon(s), alone or in combination, with one or more other typical inert condensable agent(s) or condensing agent(s) are used in the process of the invention. Examples of suitable, preferably inert, condensable agents are readily volatile liquid hydrocarbons, which include, for example, saturated hydrocarbons containing from 1 to 8 carbon atoms, preferably 3 to 8 carbon atoms, such as propane, n-butane, isobutane (MW of 58.12 a.m.u, a liquid density of 0.55 g/cc, and normal boiling point as above described of $-11.75$), n-pentane, isopentane (MW of 72.15 a.m.u, a liquid density of 0.62 g/cc, and normal boiling point of 27.85), neopentane, n-hexane, isohexane, and other saturated $C_6$ to $C_8$ hydrocarbons.

In another embodiment, the diluent or diluent mixture is selected based upon its solubility or lack thereof in a particular polymer being produced. Preferred diluents have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the diluent, exposed for 90 seconds to evaporate excess condensable fluid from the surface of the film, and weighed. The mass uptake is defined as the percentage increase in the film weight after soaking. The diluent or diluent mixture is selected so that the polymer has a mass uptake of less than 4 wt %, preferably less than 3 wt %, more preferably less than 2 wt %, even more preferably less than 1 wt %, and most preferably less than 0.5 wt %.

In a preferred embodiment, the diluent(s) or mixtures thereof, preferably, the fluorinated hydrocarbon(s) or mixtures thereof, are selected such that the polymer melting temperature Tm is reduced (or depressed) by not more than 15° C. by the presence of the condensable fluid. The depression of the polymer melting temperature ΔTm is determined by first measuring the melting temperature of a polymer by differential scanning calorimetry (DSC), and then comparing this to a similar measurement on a sample of the same polymer that has been soaked with the condensable fluid. In general, the melting temperature of the soaked polymer will be lower than that of the dry polymer. The difference in these measurements is taken as the melting point depression ΔTm. It is well known to those in the art that higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the condensable fluid to be evaluated). As described in the reference above, it is important to ensure that the second part of the test, conducted in the presence of the liquid, is done in a sealed container so that the liquid is not flashed during the test, which could introduce experimental error. In one embodiment, the ΔTm of the diluent, especially the fluorinated hydrocarbon, is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

V. Catalyst System

A. Catalyst Compounds

The catalyst system of the invention will typically include a catalyst compound, and an activator compound, and may also include support materials and one or more co-catalysts. The components of the catalyst system are chosen to be capable of being utilized in the polymerization process selected. For example, polymerization may be conducted in a slurry and/or in a solution where the slurry and solution are used separately or combined and introduced into a polymerization reactor. The catalyst compounds which may be utilized in the catalyst systems of the invention for such polymerizations include: bulky ligand metallocene compounds; transition metal catalysts (e.g., Ziegler Natta, Phillips); Group 15 containing metal compounds; phenoxide catalyst compounds; and additionally discovered catalyst compounds. The catalysts, co-catalysts and activator compounds can include the support materials. As used herein, the new notation numbering scheme for the Periodic Table Groups are used as set out in *Chemical And Engineering News*, 63(5), 27 (1985).

In some embodiment, however, it is preferred that the catalyst system not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as a peroxide.

1. Bulky Ligand Metallocenes

The catalyst compositions of the invention may include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthamide or actinide series of the Periodic Table of Elements. Preferably the metal is a transition metal from Groups 4 through 12, more preferably Groups 4, 5 and 6, and most preferably the transition metal is from Group 4.

In one embodiment, the catalyst composition of the invention includes one or more bulky ligand metallocene catalyst compounds represented by the formula:

$$L^A L^B MQ_n \qquad (III)$$

where M is a metal atom from the Periodic Table of the Elements and may be a Group 3 to 12 metal or from the lanthamide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopenta-cyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula III only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-phenyl, prop-2-phenyl, hex-5-phenyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula III above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition of the invention may include one or more bulky ligand metallocene catalyst compounds where $L^A$ and $L^B$ of Formula III are bridged to each other by at least one bridging group, A, as represented by Formula IV.

$$L^A A L^B M Q_n \qquad (IV)$$

The compounds of Formula IV are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si\ R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula IV have two or more bridging groups A (EP 664 301 B1).

In another embodiment, the bulky ligand metallocene catalyst compounds are those where the R substituents on the bulky ligands $L^A$ and $L^B$ of Formulas III and IV are substituted with the same or different number of substituents on each of the bulky ligands. In another embodiment, the bulky ligands $L^A$ and $L^B$ of Formulas III and IV are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the catalyst composition of the invention includes one or more bulky ligand metallocene catalyst compounds represented by Formula V:

$$L^C AJMQ_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula V above, $L^C$, A and J form a fused ring system. In an embodiment, $L^C$ of Formula V is as defined above for $L^A$. A, M and Q of Formula V are as defined above in Formula III.

In Formula V J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula V, the fluorocarbon preferably is a hydrofluorocarbon. Preferably, when the catalyst system comprises compounds represented by Formula V, the fluorocarbon is not a perfluorocarbon.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, (now U.S. Pat. No. 6,103,657) which is herein incorporated by reference. In another embodiment, the bulky ligand metallocene catalyst compounds are those described in PCT publications WO 99/01481 and WO 98/42664, which are fully incorporated herein by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the catalyst composition of the invention includes one or more bulky ligand metallocene catalyst compounds is represented by Formula VI:

$$L^D MQ_2(YZ)X_n \qquad (VI)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a uncharged polydentate ligand; or Q is a univalent anionic ligand also bonded to M; X is a univalent anionic group when n is 2 or X is a divalent anionic group when n is 1; n is 1 or 2.

In Formula VI, L and M are as defined above for Formula III. Q is as defined above for Formula III, preferably Q is selected from the group consisting of —O—, —NR—, —CR2— and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst systems are described in U.S. Pat. No. 5,942,462, which is incorporated herein by reference.

Still other useful catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

2. Transition Metal Compounds

In another embodiment, conventional-type transition metal catalysts may be used in the practice of this invention. Conventional-type transition metal catalysts are those traditional Ziegler-Natta, vanadium and Phillips-type catalysts well known in the art. Such as, for example Ziegler-Natta catalysts as described in *Ziegler-Natta Catalysts and Polymerizations*, John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359 and 4,960,741, all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

Preferred conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot {}^1/_3 AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference. Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A10 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437, all of which are incorporated herein by reference.

It is also contemplated that other catalysts can be combined with the catalyst compounds in the catalyst composition of the invention. For example, see U.S. Pat. Nos. 4,937,299, 4,935,474, 5,281,679, 5,359,015, 5,470,811, and 5,719,241 all of which are herein fully incorporated herein reference.

It is further contemplated that one or more of the catalyst compounds described above or catalyst systems may be used in combination with one or more conventional catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

3. Group 15 Catalysts

In one embodiment, the catalyst compounds utilized in the invention include: one or more Group 15 containing metal catalyst compounds. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In another embodiment, the Group 15 containing metal compound of the present invention may be represented by the formulae:

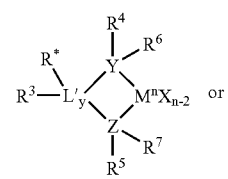

Formula I

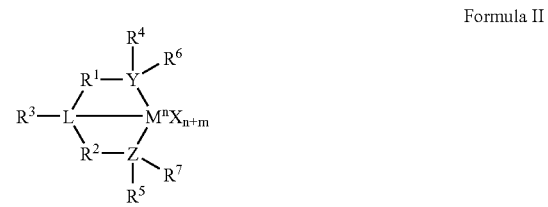

Formula II wherein:

M is a Group 3 to 12 transition metal or a Group 13 or 14 main group metal, preferably a Group 4, 5, or 6 metal, and more preferably a Group 4 metal, and most preferably zirconium, titanium or hafnium;

X is independently a leaving group, preferably, an anionic leaving group, and more preferably hydrogen, a hydrocarbyl group, a heteroatom or a halogen, and most preferably an alkyl;

y is 0 or 1 (when y is 0 group L' is absent);

n is the oxidation state of M, preferably +3, +4, or +5, and more preferably +4;

m is the formal charge of the YZL or the YZL' ligand, preferably 0, −1, −2 or −3, and more preferably −2;

L is a Group 15 or 16 element, preferably nitrogen;

L' is a Group 15 or 16 element or Group 14 containing group, preferably carbon, silicon or germanium;

Y is a Group 15 element, preferably nitrogen or phosphorus, and more preferably nitrogen;

Z is a Group 15 element, preferably nitrogen or phosphorus, and more preferably nitrogen;

$R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group, wherein $R^1$ and $R^2$ may also be interconnected to each other;

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen;

$R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group;

$R^1$ and $R^2$ may be interconnected to each other, and/or $R^4$ and $R^5$ may be interconnected to each other;

$R^6$ and $R^7$ are independently absent, hydrogen, an alkyl group, halogen, heteroatom, or a hydrocarbyl group, preferably a linear, cyclic or branched alkyl group having 1 to 20 carbon atoms, and more preferably absent; and R* is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

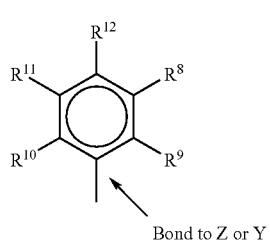

Formula I wherein:

$R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group, wherein the cyclic groups may be aromatic.

In a preferred embodiment of Formula 1, $R^9$, $R^{10}$ and $R^{12}$ are independently a methyl, ethyl, propyl or butyl group (including all isomers). In another preferred embodiment, $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

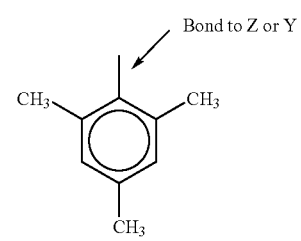

Formula 2

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In another particularly preferred embodiment, the Group 15 containing metal compound is represented by Compound 1 below:

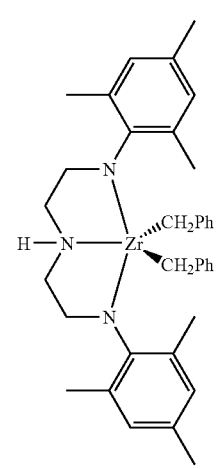

Compound 1 wherein Ph in Compound 1 equals phenyl.

The Group 15 containing metal compounds utilized in the catalyst composition of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

A preferred direct synthesis of these compounds comprises reacting the neutral ligand, (see for example YZL or YZL' of formula I or II) with $M''X_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL' of formula I or II) with a compound represented by the formula $M''X_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

For additional information of Group 15 containing metal compounds, please see Mitsui Chemicals, Inc. in EP 0 893 454 A1 which discloses transition metal amides combined with activators to polymerize olefins.

In one embodiment the Group 15 containing metal compound is allowed to age prior to use as a polymerization. It has been noted on at least one occasion that one such catalyst compound (aged at least 48 hours) performed better than a newly prepared catalyst compound.

4. Phenoxides

The catalyst composition of the invention may include one or more phenoxide catalyst compounds represented by the following formulae:

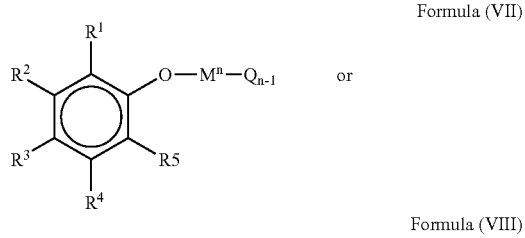

Formula (VII)

or

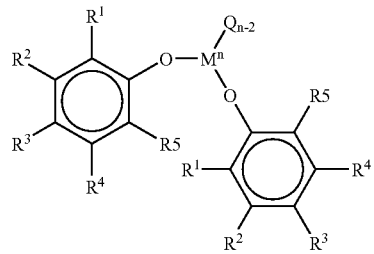

Formula (VIII)

wherein:

$R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M;

at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M;

O is oxygen;

M is a group 3 to group 10 transition metal or lanthamide metal, preferably a group 4 metal, preferably Ti, Zr or Hf; and n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$.

A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment, Q is a bond to any of R2 to R5, and the R group that Q is bound to is a heteroatom containing group.

This invention may also be practiced with the catalysts disclosed in EP 0 874 005 A1, which in incorporated by reference herein.

5. Additional Compounds

The catalyst compositions of the invention may include one or more complexes known as transition metal catalysts based on bidentate ligands containing pyridine or quinoline moieties, such as those described in U.S. Pat. No. 6,103,657, which is herein incorporated by reference.

In one embodiment, these catalyst compounds are represented by the formula:

$$((Z)XA_t(YJ))_qMQ_n \qquad (IX)$$

where M is a metal selected from Group 3 to 13 or lanthamide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is within the scope of this invention, in one embodiment, the catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", *J. Am. Chem. Soc.* 1995, 117, 6414-6415 and Johnson, et al., "Copolymerization of Ethylene and Propylene with Functionalized Vinyl Monomers by Palladium(II) Catalysts", *J. Am. Chem. Soc.,* 1996, 118, 267-268, and WO 96/23010 published Aug. 1, 1996, WO 99/02472, U.S. Pat. Nos. 5,852,145, 5,866,663 and 5,880, 241, which are all herein fully incorporated by reference. These complexes can be either dialkyl ether adducts, or alkylated reaction products of the described dihalide complexes that can be activated to a cationic state by the activators of this invention described below.

Other catalyst compounds include those nickel complexes described in WO 99/50313, which is incorporated herein by reference.

Also included are those diimine based ligands of Group 8 to 10 metal catalyst compounds disclosed in PCT publications WO 96/23010 and WO 97/48735 and Gibson, et al., *Chem. Comm., pp.* 849-850 (1998), all of which are herein incorporated by reference.

Other useful catalyst compounds are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in *Organometallics* 1195, 14, 5478-5480, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is herein incorporated herein by reference.

B. Supports, Carriers and Techniques

In one embodiment, the catalyst composition of the invention includes a support material or carrier, and preferably includes a supported activator. For example, the catalyst composition component, preferably the activator compound and/or the catalyst compound, is deposited on, contacted with, vaporized with, bonded to, or incorporated within, adsorbed or absorbed in, or on, a support or carrier.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 m2/g, pore volume in the range of from about 0.1 to about 4.0 cc/g and average particle size in the range of from about 5 to about 500 µm. More preferably, the surface area of the support material is in the range of from about 50 to about 500 m2/g, pore volume of from about 0.5 to about 3.5 cc/g and average particle size of from about 10 to about 200 µm. Most preferably the surface area of the support material is in the range is from about 100 to about 400 m2/g, pore volume from about 0.8 to about 3.0 cc/g and average particle size is from about 5 to about 100 µm. The average pore size of the carrier of the invention typically has pore size in the range of from 10 to 1000 Å, preferably 50 to about 500 Å, and most preferably 75 to about 350 Å.

The support materials may be treated chemically, for example with a fluoride compound as described in WO 00/12565, which is herein incorporated by reference. Other supported activators are described in for example WO 00/13792 that refers to supported boron containing solid acid complex.

In a preferred embodiment, fumed silica available under the trade name Cabosil™ TS-610, available from Cabot Corporation is utilized as a nucleating agent or as a viscosity builder in the catalyst component slurry discussed below. Fumed silica is typically a silica with particles 7 to 30 nanometers in size that has been treated with dimethylsilyldichloride such that a majority of the surface hydroxyl groups are capped. In another embodiment the fumed silica utilized has a particle size of less than 40 microns, preferably less than 20 microns or preferably less than 10 microns.

In a preferred method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures is discussed in Volume 1, *Experimental Methods in Catalytic Research* (Academic Press, 1968) (specifically see pages 67-96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332-334 (March, 1956).

C. Activators and Activation Methods

The polymerization catalyst compounds useful in this invention can be activated in various ways to yield compounds having a vacant coordination site that will coordinate, insert, and polymerize olefin(s). For the purposes of this invention, the term "activator" is defined to be any compound which can activate any one of the catalyst compounds described herein by converting the neutral catalyst compound to a catalytically active catalyst cation compound. Non-limiting activators, for example, include alumoxanes, aluminum alkyls, ionizing activators, which may be neutral or ionic, and conventional-type cocatalysts.

1. Alumoxanes

In one embodiment, alumoxanes activators are utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum Alkyl or organoaluminum compounds which may be utilized as activators include trimethylaluminum, triethylaluminum, triisobutylaluminum, tri-n-hexylaluminum, tri-n-octylaluminum and the like.

2. Ionizing Activators

It is within the scope of this invention to use an ionizing or stoichiometric activator, neutral or ionic, such as tri(n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

"Substituted alkyl" refers to an alkyl as described in which one or more hydrogen atoms of the alkyl is replaced by another group such as a halogen, aryl, substituted aryl, cycloalkyl, substituted cycloalkyl, and combinations thereof. Examples of substituted alkyls include, for example, benzyl, trifluoromethyl and the like.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \tag{X}$$

wherein:

L is an neutral Lewis base;

H is hydrogen;

$(L-H)^+$ is a Bronsted acid $A^{d-}$ is a non-coordinating anion having the charge d− d is an integer from 1 to 3.

The cation component, $(L-H)_d^+$ may include Bronsted acids such as protons or protonated Lewis bases or reducible Catalysts capable of protonating or abstracting a moiety, such as an alkyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+.(A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

3. Additional Activators

Other activators include those described in PCT publication WO 98/07515 such as tris(2,2',2''-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound. WO 99/18135, incorporated herein by reference, describes the use of organo-boron-aluminum acitivators. EP-B31-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula: $(OX^{e+})_d (A^{d-})_e$, wherein: $OX^{e+}$ is a cationic oxidizing agent having a charge of e+; e is an integer from 1 to 3; and $A^-$, and d are as previously defined. Examples of cationic oxidizing agents include: ferrocenium, hydrocarbyl-substituted ferroceniumn, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that catalyst compounds can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

4. Supported Activators

Many supported activators are described in various patents and publications which include: U.S. Pat. No. 5,728,855 directed to the forming a supported oligomeric alkylaluminoxane formed by treating a trialkylaluminum with carbon dioxide prior to hydrolysis; U.S. Pat. Nos. 5,831,109 and 5,777,143 discusses a supported methylalumoxane made using a non-hydrolytic process; U.S. Pat. No. 5,731,451 relates to a process for making a supported alumoxane by oxygenation with a trialkylsiloxy moiety; U.S. Pat. No. 5,856,255 discusses forming a supported auxiliary catalyst (alumoxane or organoboron compound) at elevated temperatures and pressures; U.S. Pat. No. 5,739,368 discusses a process of heat treating alumoxane and placing it on a support; EP-A-0 545 152 relates to adding a metallocene to a supported alumoxane and adding more methylalumoxane; U.S. Pat. Nos. 5,756,416 and 6,028,151 discuss a catalyst composition of a alumoxane impregnated support and a metallocene and a bulky aluminum alkyl and methylalumoxane; EP-B1-0 662 979 discusses the use of a metallocene with a catalyst support of silica reacted with alumoxane; PCT WO 96/16092 relates to a heated support treated with alumoxane and washing to remove unfixed alumoxane; U.S. Pat. Nos. 4,912,075, 4,937,301, 5,008,228, 5,086,025, 5,147,949, 4,871,705, 5,229,478, 4,935,397, 4,937,217 and 5,057,475, and PCT WO 94/26793 all directed to adding a metallocene to a supported activator; U.S. Pat. No. 5,902,766 relates to a supported activator having a specified distribution of alumoxane on the silica particles; U.S. Pat. No. 5,468,702 relates to aging a supported activator and adding a metallocene; U.S. Pat. No. 5,968,864 discusses treating a solid with alumoxane and introducing a metallocene; EP 0 747 430 A1 relates to a process using a metallocene on a supported methylalumoxane and trimethylaluminum; EP 0 969 019 A1 discusses the use of a metallocene and a supported activator; EP-B2-0 170 059 relates to a polymerization process using a metallocene and a organoaluminuim compound, which is formed by reacting aluminum trialkyl with a water containing support; U.S. Pat. No. 5,212,232 discusses the use of a supported alumoxane and a metallocene for producing styrene based polymers; U.S. Pat. No. 5,026,797 discusses a polymerization process using a solid component of a zirconium compound and a water-insoluble porous inorganic oxide preliminarily treated with alumoxane; U.S. Pat. No. 5,910,463 relates to a process for preparing a catalyst support by combining a dehydrated support material, an alumoxane and a polyfunctional organic crosslinker; U.S. Pat. Nos. 5,332,706, 5,473,028, 5,602,067 and 5,420,220 discusses a process for making a supported activator where the volume of alumoxane solution is less than the pore volume of the support material; WO 98/02246 discusses silica treated with a solution containing a source of aluminum and a metallocene; WO 99/03580 relates to the use of a supported alumoxane and a metallocene; EP-A1-0 953 581 discloses a heterogeneous catalytic system of a supported alumoxane and a metallocene; U.S. Pat. No. 5,015,749 discusses a process for preparing a polyhydrocarbyl-alumoxane using a porous organic or inorganic imbiber material; U.S. Pat. Nos. 5,446,001 and 5,534,474 relates to a process for preparing one or more alkylaluminoxanes immobilized on a solid, particulate inert support; and EP-A1-0 819 706 relates to a process for preparing a solid silica treated with alumoxane. Also, the following articles, also fully incorporated herein by reference for purposes of disclosing useful supported activators and methods for their preparation, include: W. Kaminsky, et al., "Polymerization of Styrene with Supported Half-Sandwich Complexes," *Journal of Polymer Science*, Vol. 37, 2959-2968 (1999) describes a process of adsorbing a methylaluxmoxane to a support followed by the adsorption of a metallocene; Junting Xu, et al. "Characterization of isotactic polypropylene prepared with dimethylsilyl bis(1-indenyl)zirconium dichloride supported on methylaluminoxane pretreated silica,"*European Polymer Journal*, 35 (1999) 1289-1294, discusses the use of silica treated with methylalumoxane and a metallocene; Stephen O'Brien, et al., "EXAFS analysis of a chiral alkene polymerization catalyst incorporated in the mesoporous silicate MCM-41," *Chem. Commun.*, 1905-1906 (1997) discloses an immobilized alumoxane on a modified mesoporous silica; and F. Bonini, et al., "Propylene Polymerization through Supported Metallocene/MAO Catalysts: Kinetic Analysis and Modeling," *Journal of Polymer Science*, Vol. 33 2393-2402 (1995) discusses using a methylalumoxane supported silica with a metallocene. Any of the methods discussed in these references are useful for producing the supported activator component utilized in the catalyst composition of the invention and all are incorporated herein by reference.

In another embodiment, the supported activator, such as supported alumoxane, is aged for a period of time prior to use herein. For reference please refer to U.S. Pat. Nos. 5,468,702 and 5,602,217, incorporated herein by reference.

In an embodiment, the supported activator is in a dried state or a solid. In another embodiment, the supported activator is in a substantially dry state or a slurry, preferably in a mineral oil slurry.

In another embodiment, two or more separately supported activators are used, or alternatively, two or more different activators on a single support are used.

In another embodiment, the support material, preferably partially or totally dehydrated support material, preferably 200° C. to 600° C. dehydrated silica, is then contacted with an organoaluminum or alumoxane compound. Preferably in an embodiment where an organoaluminum compound is used, the activator is formed in situ on and in the support material as a result of the reaction of, for example, trimethylaluminum and water.

In another embodiment, Lewis base-containing supports are reacted with a catalyst activator to form a support bonded catalyst compound. The Lewis base hydroxyl groups of silica are exemplary of metal/metalloid oxides where this method of bonding to a support occurs. This embodiment is described in U.S. Pat. No. 6,147,173, which is herein incorporated by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 catalyst compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Catalyst catalysts suitable for carbocationic polymerizations are described in U.S. Pat. No. 5,288,677; and James C. W. Chien, *Jour. Poly. Sci.: Pt A: Poly. Chem.*, Vol. 29, 1603-1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In a preferred embodiment, a supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In another embodiment a support is combined with one or more activators and is spray dried to form a supported activator. In a preferred embodiment, fumed silica is combined with methyl alumoxane and then spray dried to from supported methyl alumoxane. Preferably a support is combined with alumoxane, spray dried and then placed in mineral oil to form a slurry useful in the instant invention.

D. Cocatalysts

Cocatalysts that can be used according to this invention include one or more cocatalysts represented by the formula:

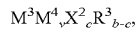

wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

E. Spray Dried Catalysts

In another embodiment, the catalyst compounds described are combined with support material(s) and/or activator(s) and spray dried. In another embodiment, the catalyst compounds and/or the activators are combined with a support material such as a particulate filler material and then spray dried, preferably to form a free flowing powder.

Spray drying may be by any means known in the art. Please see EP A 0 668 295 B1, U.S. Pat. Nos. 5,674,795 and 5,672,669 and U.S. patent application Ser. No. 09/464,114 filed Dec. 16, 1999, which particularly describe spray drying of supported catalysts. In general one may spray dry the catalysts by placing the catalyst compound and the optional activator in solution (allowing the catalyst compound and activator to react, if desired), adding a filler material such as silica or fumed silica, such as Gasil™ or Cabosil™, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5 to 8 wt %. This formulation may sit as a slurry for as long as 30 minutes with mild stirring or manual shaking to keep it as a suspension before spray-drying. In one preferred embodiment, the makeup of the dried material is about 40-50 wt % activator (preferably alumoxane), 50-60 $SiO_2$ and about ~2 wt % catalyst compound.

In another embodiment, fumed silica such as such as Gasil™ or Cabosil™ may be added to a solution containing a catalyst compound such that when that solution is added to the catalyst component slurry or injected into a polymerization reactor, the fumed silica acts as a template for "in situ spray" drying.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 vol % can be present in the activator/filler mixture prior to the addition of the first metal catalyst compound.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

In another embodiment a solution of a bulky ligand metallocene compound and optional activator can be combined with a different slurried spray dried catalyst compound and then introduced into a reactor.

The spray dried particles are generally fed into the polymerization reactor as a mineral oil slurry. Solids concentrations in oil are about 10 to 30 weight %, preferably 15 to 25 weight %. In some embodiments, the spray dried particles can be from less than about 10 micrometers in size up to about 100 micrometers, compared to conventional supported catalysts which are about 50 micrometers. In a preferred embodiment the support has an average particle size of 1 to 50 microns, preferably 10 to 40 microns.

F. Catalyst Slurry and Solution Components

The catalyst of the invention can be added to the reaction system in the form of a slurry or a solution or a combination of slurry and solution. In one embodiment, the catalyst in slurry form and includes an activator and a support, or a supported activator. In another embodiment, the catalyst slurry includes fumed silica. In another embodiment, the slurry includes a catalyst compound in addition to the activator and the support and/or the supported activator. In one embodiment, the catalyst compound in the slurry is supported.

In another embodiment, the slurry includes one or more activator(s) and support(s) and/or supported activator(s) and/or one more catalyst compound(s). For example, the slurry may include two or more activators (such as a supported alumoxane and a modified alumoxane) and a catalyst compound, or the slurry may include a supported activator and more than one catalyst compounds. Preferably, the slurry comprises a supported activator and two catalyst compounds.

In another embodiment the slurry comprises supported activator and two different catalyst compounds, which may be added to the slurry separately or in combination.

In another embodiment of the slurry, containing a supported alumoxane, is contacted with a catalyst compound, allowed to react, and thereafter the slurry is contacted with another catalyst compound. In another embodiment the slurry containing a supported alumoxane is contacted with two catalyst compounds at the same time, and allowed to react.

In another embodiment the molar ratio of metal in the activator to metal in the catalyst compound in the slurry is 1000:1 to 0.5:1, preferably 300:1 to 1:1, more preferably 150:1 to 1:1.

In another embodiment the slurry contains a support material which may be any inert particulate carrier material known in the art, including, but not limited to, silica, fumed silica, alumina, clay, talc or other support materials such as disclosed above. In a preferred embodiment, the slurry contains a supported activator, such as those disclosed above, preferably methyl alumoxane and/or modified methyl alumoxane on a support of silica.

A catalyst slurry can be prepared by suspending the catalyst components, preferably the support, the activator and optional catalyst compounds in a liquid diluent. The liquid diluent is typically an alkane having from 3 to 60 carbon atoms, preferably having from 5 to 20 carbon atoms, preferably a branched alkane, or an organic composition such as mineral oil or silicone oil. The diluent employed is preferably liquid under the conditions of polymerization and relatively inert. The concentration of the components in the slurry is controlled such that a desired ratio of catalyst compound(s) to activator, and/or catalyst compound to catalyst compound is fed into the reactor.

Typically, as a slurry, the catalyst compound and the support and activator, or supported activator, and the slurry diluent are allowed to contact each other for a time sufficient for at least 50% of the catalyst compounds to be deposited into or on the support, preferably at least 70%, preferably at least 75%, preferably at least 80%, more preferably at least 90%, preferably at least 95%, preferably at least 99%. In an embodiment, the slurry is prepared prior to its use in the catalyst feed system. Times allowed for mixing are up to 10 hours, typically up to 6 hours, more typically 4 to 6 hours. In one embodiment of this invention a catalyst compound will be considered to be in or on the support if the concentration of the catalyst compound in the liquid portion of the slurry is reduced over time after adding the catalyst compound to the slurry. Concentration of the catalyst compound in the liquid diluent may be measured for example, by inductively coupled plasma spectroscopy (ICPS), or by ultraviolet (UV) spectroscopy, after standardization with a calibration curve prepared at the appropriate concentration range, as is known in the art. Thus for example, 70% of a catalyst compound will be considered to have deposited in or on a support if the concentration of the catalyst compound in the liquid (not including the support) is reduced by 70% from its initial concentration.

In one embodiment, the catalyst compounds are added to the slurry as a solution, slurry, or powder. The slurry may be prepared prior to its use in the polymerization process of the invention or it may be prepared in-line.

In one embodiment, the slurry is prepared by combining the catalyst components, such as for example the catalyst or supported catalyst and the support and activator or supported activator, all at once. In another embodiment, the slurry is prepared by first adding a support material, then adding the combination of a catalyst and an activator component.

In another embodiment the slurry comprises a supported activator and at least one catalyst compound where the catalyst compound is combined with the slurry as a solution. A preferred solvent is mineral oil.

In a another embodiment, alumoxane, preferably methyl alumoxane or modified methyl alumoxane, is combined with a support such as calcined silica or fumed silica to form a supported activator, the supported activator is then dispersed in a liquid, such as degassed mineral oil, and then one or more catalyst compounds are added to the dispersion and mixed to form the catalyst component slurry. The catalyst compounds are preferably added to the dispersion as a solid, powder, solution or a slurry, preferably a slurry of mineral oil. If more than one catalyst compound is added to the dispersion, the catalyst compounds can be added sequentially, or at the same time.

In another embodiment the catalyst compound is added to the slurry in solid or powder form. In a preferred embodiment, a Group 15 containing catalyst compound is added to the slurry in powder or solid form. In another preferred embodiment, $[(2,4,6-Me_3C_6H_2)NCH_2CH_2]_2NHZrBz_2$ and or $[(2,4,6-Me_3C_6H_2)NCH_2CH_2]_2NHHfBz_2$ is added to the slurry as a powder.

In a preferred embodiment the slurry comprises mineral oil and has a viscosity of about 130 to about 2000 cP at 20° C., more preferably about 180 to about 1500 cP at 20° C. and even more preferably about 200 to about 800 cP at 20° C. as measured with a Brookfield model LVDV-III Rheometer housed in a nitrogen purged drybox (in such a manner that the atmosphere is substantially free of moisture and oxygen, i.e. less than several ppmv of each). The slurry can be made in a nitrogen purged drybox, and rolled in closed glass containers until immediately before the viscosity measurements are made, in order to ensure that it is fully suspended at the start of the trial.

In one embodiment, the slurry comprises a supported activator and one or more or a combination of the catalyst compound(s) described in Formula I to IX above.

In another embodiment, the slurry comprises a supported activator and one or more or a combination of the Group 15 catalyst compound(s) represented by Formula I or II described above.

In another embodiment, the slurry comprises a supported activator and one or more or combination of the bulky ligand catalyst compound(s) represented by Formula III to VI described above.

In another embodiment, the slurry comprises supported activator, a Group 15 catalyst compound(s) represented by Formula I or II described above, and a the bulky ligand catalyst compound(s) represented by Formula III to VI.

In another embodiment, the slurry comprises supported alumoxane and $[(2,4,6-Me_3C_6H_2)NCH_2CH_2]_2NH\ MBz_2$ where M is a Group 4 metal, each Bz is a independently a benzyl group and Me is methyl.

In another embodiment, the slurry comprises a supported alumoxane, a Group 15 catalysts compound and one of the following: bis(n-propyl cyclopentadienyl)-$MX_2$, (pentamethylcyclopentadienyl)(n-propylcyclopentadienyl)$MX_2$, bis(indenyl)-$MX_2$, or (tetramethylcyclopentadienyl) (n-propyl cyclopentadienyl) $MX_2$, where M is zirconium, hafnium or titanium and X is chlorine, bromine, or fluorine.

In one embodiment, the catalyst is added to the reaction system as a solution that includes a catalyst compound. In another embodiment, the solution also includes an activator in addition to the catalyst compound.

The solution used in the process of this invention is typically prepared by dissolving the catalyst compound and optional activators in a liquid solvent. The liquid solvent is typically an alkane, such as a $C_5$ to $C_{30}$ alkane, preferably a $C_5$ to $C_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. In one embodiment, the liquid utilized in the solution is different from the diluent used in the slurry. In another embodiment, the liquid utilized in the solution is the same as the diluent used in the slurry.

In a preferred embodiment the ratio of metal in the activator to metal in the catalyst compound in the solution is 1000:1 to 0.5:1, preferably 300:1 to 1:1, more preferably 150:1 to 1:1.

In a preferred embodiment, the activator and catalyst compound is present in the solution at up to about 90 wt %, preferably at up to about 50 wt %, preferably at up to about 20 wt %, preferably at up to about 10 wt %, more preferably at up to about 5 wt %, more preferably at less than 1 wt %, more preferably between 100 ppm and 1 wt % based upon the weight of the solvent and the activator or catalyst compound.

In one embodiment, the solution comprises any one of the catalyst compounds described in Formula I to IX above.

In another embodiment, the solution comprises a Group 15 catalyst compound represented by Formula I or II described above.

In another embodiment, the solution comprises a bulky ligand catalyst compound represented by Formula III to VI described above.

In a preferred embodiment the solution comprises bis(n-propyl cyclopentadienyl)-$MX_2$, (pentamethylcyclopentadienyl)(n-propylcyclopentadienyl)$MX_2$, bis(indenyl)-$MX_2$, (tetramethylcyclopentadienyl) (n-propylcyclopentadienyl) $MX_2$, where M is a Group 4 metal, preferably zirconium, hafnium or titanium and X is chlorine, bromine, or fluorine.

In the polymerization process of the invention, any catalyst solutions may be combined with any catalyst containing slurry. In addition, more than one catalyst component may be utilized.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

VI. Processes

A. General Process Conditions and Reactor Systems

This invention pertains to any prepolymerization and/or polymerization process, and the process is suitably carried out over a wide range of temperatures and pressures. Such processes include, for example, solution, gas phase, slurry phase, medium pressure and high pressure processes or any combination thereof. Particularly preferred is gas phase or slurry phase polymerization of one or more olefins. In a particularly preferred embodiment, at least one of the olefins is ethylene or propylene.

The prepolymerization and/or polymerization process can be carried out in a batch or continuous process. By continuous is meant a system that operates (or is intended to operate) without interuption or cessation. For example a continuous process to produce a polymer would be one in which the reactants are continuously introduced into one or more reactors and polymer product is continually withdrawn. In a preferred embodiment any of the polymerization process described herein are a continuous process.

Polymerization processes according to this invention are carried out at any temperature or temperature range effective in carrying out the polymerization process. In general, effective temperatures range from about −80° C. to 350° C., preferably from about 0° C. to 200° C., more preferably from about 50° C. to 120° C. In another embodiment, the polymerization temperature is above room temperature (23° C.), preferably above 30° C., preferably above 50° C., preferably above 70° C.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment, the process of this invention is directed toward a solution, medium pressure, high pressure, slurry phase or gas phase polymerization process of one or more olefin monomers having from 2 to 30 carbon atoms, preferably 2 to 12 carbon atoms, and more preferably 2 to 8 carbon atoms. The invention is particularly well suited to the polymerization of one or more olefin monomers of ethylene, propylene, 1-butene, 1-pentene, 4-methyl-pentene-1,1-hexene, 1-octene and 1-decene.

In another preferred embodiment of the invention, ethylene is polymerized with a comonomer, the comonomer having at least one alpha-olefin having from 3 to 15 carbon atoms, preferably from 4 to 12 carbon atoms, and most preferably from 4 to 8 carbon atoms. Preferably the reaction is carried out in a gas phase process.

In another embodiment of the invention, ethylene or propylene is polymerized with at least two different comonomers, optionally one of which may be a diene, to form a terpolymer.

In yet another embodiment, the mole ratio of comonomer to ethylene, $C_x/C_2$, where $C_x$ is the amount of comonomer and $C_2$ is the amount of ethylene, is from about 0.001 to 0.4 and more preferably from about 0.02 to 0.2.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Another preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

In one embodiment of the invention, olefin(s), preferably $C_2$ to $C_{30}$ olefin(s) or alpha-olefin(s), preferably ethylene or propylene or combinations thereof are prepolymerized in the presence of the metallocene catalyst systems of the invention described above prior to the main polymerization. In one embodiment, the prepolymerization process is carried out in a gas, solution or slurry phase at effective prepolymerization temperatures and pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923, 833, 4,921,825, 5,283,278 and 5,705,578 and European publication EP-B-0279 863 and PCT Publication WO 97/44371 all of which are herein fully incorporated by reference.

In one embodiment, the polymerization is carried out where the catalyst, monomer, and diluent are present in a single phase. In a preferred embodiment, polymerization is carried out as a continuous polymerization process in which catalyst, monomer, and diluent are present in a single phase. By continuous is meant a system that operates (or is intended to operate) without interuption or cessation. For example a continuous process to produce a polymer would be one where the reactants are continuously introduced into one or more reactors and polymer product is continually withdrawn.

The reactor used in the polymerization process of this invention, will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 5 wt % (based on the total weight of the monomers, diluent, and catalyst system), preferably greater than 15 wt %, greater than 30 wt % in another embodiment. In yet another embodiment, the feed-stream will contain from 5 wt % to 50 wt % monomer concentration based on the total weight of monomer, diluent, and catalyst system.

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight average molecular weights.

In one embodiment of the invention, a liquid process is employed, which comprises contacting olefin monomers with polymerization catalyst in an optional solvent and allowing the monomers to react for a sufficient time to produce the desired polymers. Hydrocarbon solvents suitable for the process include aliphatic and aromatic solvents. Alkanes, such as hexane, pentane, isopentane, and octane, are preferred.

B. Gas Phase Embodiments

One embodiment of the invention incorporates the use of a gas phase polymerization process. Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The productivity of the catalyst or catalyst system in a gas phase system is influenced by the partial pressure of the main monomer. The preferred mole percent of the main monomer, ethylene or propylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor and processes utilized in the invention are capable of producing greater than 500 lbs of polymer per hour (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/br (15,900 kg/hr), still even more preferably greater than 50,000 lbs/hr (22,700 kg/hr) and most preferably greater than 65,000 lbs/hr (29,000 kg/hr) to greater than 100,000 lbs/hr (45,500 kg/hr).

In another preferred embodiment the catalyst system in is liquid form and is introduced into the gas phase reactor into a resin particle lean zone. For information on how to introduce a liquid catalyst system into a fluidized bed polymerization into a particle lean zone, please see U.S. Pat. No. 5,693,727, which is incorporated by reference herein.

C. Slurry Process Embodiments

One embodiment of the invention incorporates the use of a slurry phase polymerization process, preferably as a continuous polymerization process. The slurry polymerization process is preferably carried out at pressures in the range of from about 1 to about 100 atmospheres, preferably in the range of from 1 to 50 atmospheres. Operating temperatures are generally in the range of 0° C. to about 120° C.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 5,986, 021, which are herein fully incorporated by reference.

In one embodiment, the reactor used in the slurry process of the invention is capable of producing greater than 500 lbs of polymer per hour (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 100,000 lbs/hr (45,500 kg/hr).

In one embodiment, polymer granules and supported catalyst particles are present as solid particles in the slurry reactor, and the slurry diluent is a hydrofluorocarbon, one or more hydrocarbons, or mixtures thereof. In one embodiment, the concentration of solid particles in the slurry is equal to or greater than 10 vol %. In another embodiment, the solid particles are present in the slurry at a concentration equal to or greater than 25 vol %. In yet another embodiment, the solid particles are present in the slurry at a concentration less than or equal to 75 vol %. In yet another embodiment, the solid particles are present in the slurry at concentrations ranging from 1 to 70 vol %; from 5 to 70 vol %; from 10 to 70 vol %; from 15 to 70 vol %; from 20 to 70 vol %; from 25 to 70 vol %; from 30 to 70 vol %; or from 40 to 70 vol %.

D. Solution Process

In one embodiment, the process of this invention is carried out as a solution polymerization process. Generally, the solution process involves polymerization in a continuous reactor in which the starting monomer(s) and catalyst materials supplied and the polymer formed, are agitated to reduce or avoid concentration gradients. Suitable processes operate above the melting point of the polymers at high pressures, from 1 bar (100 kPa) to 3000 bar (300 MPa), in which the monomer acts as diluent or in solution polymerization using a solvent.

Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg (133 Pa) to 2500 bar (250 MPa), preferably from 0.1 bar (10 kPa) to 1600 bar (160 MPa), most preferably from 1.0 (100 kPa) to 500 bar (50 MPa).

Examples of solution processes are described in U.S. Pat. Nos. 4,271,060, 5,001,205, 5,236,998, 5,589,555 and 5,977, 251 and PCT WO 99/32525 and PCT WO 99/40130, which are fully incorporated herein by reference.

E. Medium and High Pressure Polymerization

The polymerization process of this invention can also be carried out at medium or high pressures. For medium pressure processes, the temperature at which the polymerization reaction occurs is at least 80° C. and ranges from 80° C. to 250° C., preferably from 100° C. to 220° C., and should for a given polymer in the reactor, be above the melting point of said polymer so as to maintain the fluidity of the polymer-rich phase. The pressure can be varied from 100 to 1000 bar for ethylene homopolymers and from 30 bar (3 MPa) to 1000 bar (100 MPa), especially 50 bar (5 MPa) to 500 bar (50 MPa) for processes producing ethylene copolymers containing $C_3$ to $C_{10}$ olefins and optionally other copolymerizable olefins.

In high pressure processes, particularly for the polymerization of ethylene alone or in combination with $C_3$ to $C_{10}$ alpha-olefins, and optionally other copolymerizable olefins, the temperature of the medium in which the polymerization reaction occurs is at least 120° C. and preferably above 140° C. and may range to 350° C., but below the decomposition temperature of the polymer product, typically from 310° C. to 325° C. Preferably, the polymerization is completed at a temperature within the range of 130° C. to 230° C. The polymerization is completed at a pressure above 200 bar (20 MPa), and generally at a pressure within the range of 500 bar (50 MPa) to 3500 bar (350 MPa). Preferably, the polymerization is completed at a pressure within the range from 800 bar (80 MPa) to 2500 bar (250 MPa).

More recently, polymerization conditions for high pressure and or temperature polymerizations to prepare propylene homopolymers and copolymers of propylene with $C_3$ to $C_{10}$ olefins and optionally other copolymerizable olefins have been reported. See U.S. patent applications 60/431,185 filed Dec. 5, 2002; 60/431,077, filed Dec. 5, 2002; and 60/412,541, filed Sep. 20, 2002.

F. Reactors and Reactor Systems

The invention may be practiced in any type of polymerization reactor system, such as continuous and batch reaction systems suitable for carrying out any one or more of the solution, gas phase, slurry phase, medium pressure or high pressure processes. In one embodiment, the invention is practiced in a fluidized bed reactor, loop reactor, plug flow reactor and/or stirred tank reactor. In a particular embodiment, this invention is practiced in a "butyl reactor." Other examples of reactors include any reactor selected from the group consisting of a continuous flow reactor, stirred tank reactor, plug flow reactor, moving belt reactor, drum reactor, jet reactor, nozzle reactor, tubular reactor, autorefrigerated boiling-pool reactor or any combination thereof.

In another aspect, heat can be removed from the reactor system by use of heat transfer surfaces, such as in a tubular reactor where a coolant is on one side of the tube and the polymerizing mixture is on the other side. Heat may also be removed by evaporating the polymerizing mixture, such as may be found in an autorefrigerated boiling pool type reactor. Another example, is a plug flow reactor where a portion of the polymerizing mixture is evaporated as the mixture proceeds through the reactor. Another example is where heat is removed in a plug flow reactor through surface heat transfer using coolant on the other side of a heat transfer surface. Another example would be a reactor where polymerization takes place on a moving belt or drum where the diluent/monomer/catalyst mixture is sprayed onto the belt or drum and heat is removed by evaporation of the diluent as the reaction proceeds. In addition heat may be removed in such reactors by surface heat transfer (such as where the coolant is present on the inside of the drum or under the belt and the polymer is produced on the other side of the belt or drum). Another type of reactor is a jet or nozzle reactor. These reactors have a short residence time where the monomer, diluent and catalyst system are combined in the jet or nozzle and the polymerization occurs as the mixture passes through the nozzle at high velocity.

One or more reactors in series or in parallel may be used in this invention. Catalyst component(s) (and any activator employed) may be delivered as a solution or slurry, either separately to the reactor, activated in-line just prior to the reactor, or preactivated and pumped as an activated solution or slurry to the reactor. A preferred operation is two solutions activated in-line. For information on methods to introduce multiple catalysts into reactors, see U.S. Pat. No. 6,399,722 and WO 01/30861 A1. While these reference may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst component may also be added to both reactors, with one component being added to a first reactor and other components added to other reactors.

In one embodiment, a continuous flow stirred tank-type reactor is used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation. The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In another embodiment of the invention, a reactor capable of performing a continuous slurry process, such as disclosed in U.S. Pat. No. 5,417,930, herein incorporated by reference, is used. A reactor pump impeller is employed in the reactor and can be of the up-pumping variety or the down-pumping variety.

The order of contacting the monomer feed-stream, catalyst, initiator, and diluent may be variable. In one embodiment, the initiator and catalyst are pre-complexed by mixing together in the selected diluent for a prescribed amount of time ranging from 0.01 second to 10 hours, and then is injected into a continuous reactor through a catalyst nozzle or injection apparatus. In yet another embodiment, catalyst and the initiator are added to the reactor separately. In another embodiment, the initiator is blended with the feed monomers before injection to the reactor. Desirably, the monomer is not contacted with the catalyst, or the catalyst combined with the initiator before entering the reactor.

VII. Polymer Products

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluormonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons. (as defined under "Hydrocarbon" in Hawley's Condensed Chemical Dictionary, 13th edition, R. J. Lewis ed., John Wiley and Sons, New York, 1997. In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

A. General Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, multimodal or bimodal high molecular weight polyethylenes, polypropylene and polypropylene copolymers.

B. Density

The polymers produced according to this invention can be produced at any density suitable for the appropriate end use. In one embodiment, there can be produced ethylene based polymers having a density in the range of from 0.86 g/cc to 0.97 g/cc. For some applications, a density in the range of from 0.88 g/cc to 0.920 g/cc is preferred while in other applications, such as pipe, film and blow molding, a density in the range of from 0.930 g/cc to 0.965 g/cc is preferred. For low density polymers, such as for film applications, a density of 0.910 g/cc to 0.940 g/cc is preferred. Density is measured in accordance with ASTM method 1505.

C. Molecular Weight and Molecular Weight Distribution

The polymers produced by the process of the invention can be produced in a wide variety of molecular weights and molecular weight distributions. Molecular weights (weight average molecular weight (Mw) and number average molecular weight (Mn)) are preferably determined using a Waters 150 Size Exclusion Chromatograph (SEC) equipped with a differential refractive index detector (DRI), an online low angle light scattering (LALLS) detector and a viscometer (VIS). The details of the detector calibrations are described by T. Sun, P. Brant, R. R. Chance, and W. W. Graessley, *Macromolecules*, Volume 34, Number 19, 6812-6820, (2001), and are incorporated herein by reference.

In an embodiment of the invention, the polymers produced have a molecular weight distribution (MWD), which is defined as a ratio of weight average molecular weight to number average molecular weight (MWD=$M_w/M_n$), of greater than 1.5, preferably from 1.5 to about 70. In some embodiments, the polymer has a $M_w/M_n$ of at least 2, preferably from about 2 to 60, while in other embodiments the polymer produced has a $M_w/M_n$ of at least 5, preferably from about 5 to 50. In an embodiment, the polymer of the invention has a narrow molecular weight distribution and a broad composition distribution, and vice-versa, such as those polymers described in U.S. Pat. No. 5,798,427, incorporated herein by reference.

In another embodiment, the polyolefin produced has at least two species of molecular weights. Preferably, both species are present at greater than 20 wt %, based upon weight average molecular weight.

D. Bi- or Multi-Modal Polymers

In another embodiment of this invention, the polymer produced is bi- or multi-modal (on the SEC graph). By bi- or multi-modal means that the SEC graph of the polymer has two or more positive slopes, two or more negative slopes, and three or more inflection points (an inflection point is that point where the second derivative of the curve is equal to zero) or the graph has at least has one positive slope, one negative slope, one inflection point and a change in the positive and or negative slope greater than 20% of the slope before the change.

In one embodiment, the SEC graph has one positive slope, one negative slope, one inflection point and an Mw/Mn of 10 or more, preferably 15 or more, more preferably 20 or more. The columns are calibrated by running a series of narrow polystyrene standards and the molecular weights were calculated using Mark Houwink coefficients for the polymer in question.

In a particular embodiment, bi-modal polymers are produced having a density of 0.93 to 0.96 g/cc, an MI ($I_2$) of 0.03-0.10 g/10 min, an FI ($I_{21}$) of 4-12 g/10 min, an MFR ($I_{21}/I_2$) of 80-180, an overall Mw of 200,000 to 400,000, an overall Mn of 5,000-10,000 and an Mw/Mn of 20-50. Preferably, the particular polymers have a low molecular weight fraction (~500-~50,000) having a density of 0.935-0.975 g/cc and a high molecular weight fraction (~50,000-~8,000,000) having a density of 0.910-0.950 g/cc. These polymers are particularly useful for film and pipe, especially, for PE-100 pipe applications. The molecular weight distributions (MWDs), as obtained from size exclusion chromatography (SEC), can be deconvoluted using a bimodal fitting program. In one embodiment, the polymer has weight ratio of the high molecular weight (HMW) fraction to the low molecular weight (LMW) fraction of ranging from 20-80 to 80-20, more preferably from 30-70 to 70-30, and even more preferably from 40-60 to 60-40. A higher wt % of HMW than LMW wt % is preferred. The SEC curve can be further analyzed to give percent of wt %>1 MM, which is the weight percent of the total MWD that has a molecular weight greater than 1 million, and wt %>100K, which is the weight percent of the total MWD that is greater than 100,000 in molecular weight. The weight percent ratio is simply wt %>1 MM divided by wt %>100K. 100,000 was used as an approximate means of dividing the total MWD into a HMW (high molecular weight) and LMW (low molecular weight) region. This ratio gives a simple but sensitive indication of the relative amount of the very high molecular weight species in the HMW region of the MWD. The preferred embodiment of the polymer has the preferred range of weight percent ratio (WPR), higher than 10 but less than 30, preferably higher than 15 but less than 25.

In another embodiment, a bimodal molecular weight polymer is produced having a density of 0.93 to 0.97 g/cc, an MI ($i_{12}$) of 0.02-0.5 g/10 min, an FI ($I_{21}$) of 10-40 g/10 min, an MFR ($I_{21}/I_2$) of 50-300, an Mw of 100,000 to 500,000, an Mn of 8,000-20,000 and an Mw/Mn of 10-40. These polymers are particularly useful for blow molding applications. These bimodal polymers exhibit high Bent Strip ESCR (environmental stress crack resistance) performance, which far exceeds the performance of unimodal HDPE. Also, the blow molded bottles trim easier and typically have an opaque finish, which is preferred over a translucent finish of unimodal HDPE.

E. Composition Distribution Breadth Index

The polymers of the invention may have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. In some embodiments the polymer produced may have a CDBI of 80% or more or may have a CDBI of 50% or less.

In one embodiment, the polymers of the invention have CDBI's generally in the range of greater than 50% to 100%, preferably 99%, preferably in the range of 55% to 85%, and more preferably 60% to 80%, even more preferably greater than 60%, still even more preferably greater than 65%. In another embodiment, polymers produced using this invention have a CDBI less than 50%, more preferably less than 40%, and most preferably less than 30%.

F. Melt Index

The polymers produced by the process of the invention can be produced according to a desired or predetermined melt index, depending upon desired end use. In one embodiment, the polymers have a melt index (MI) or ($I_2$), as measured by ASTM-D-1238-E, in the range from 0.01 dg/min to 1000 dg/min, more preferably from about 0.01 dg/min to about 100 dg/min, even more preferably from about 0.01 dg/min to about 50 dg/min, and most preferably from about 0.1 dg/min to about 10 dg/min.

In another embodiment of the invention, the polymers have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio of from preferably greater than 25, more preferably greater than 30, even more preferably greater that 40, still even more preferably greater than 50 and most preferably greater than 65. In another embodiment, the polymer of the invention has a narrow molecular weight distribution and a broad composition distribution or vice-versa. Examples include those polymers described in U.S. Pat. No. 5,798,427, the description of which is incorporated herein by reference.

G. Tacticity

The term "tacticity" refers to the stereochemical configuration of a polymer, and the properties of a polymer having side chains are affected by its tacticity. For example, adjacent monomer units having side chains can have either like or opposite configuration. If all monomer units have like configuration, the polymer is "isotactic." If adjacent monomer units have an alternating configuration, and this alternating configuration continues along the entire polymer chain, the polymer is "syndiotactic." If the configuration of monomer units is random, the polymer is "atactic." When two contiguous monomer units, a "diad," have the same configuration, the diad is called isotactic or "meso" (m). When the monomer units have opposite configuration, the diad is called "racemic" (r). For three adjacent monomer units, a "triad," there are three possibilities. If the three adjacent monomer units have the same configuration, the triad is designated mm. An rr triad has the middle monomer unit having an opposite configuration from either neighbor. If two adjacent monomer units have the same configuration and it is different from the third monomer, the triad is designated as having mr tacticity. For five contiguous monomer units, a "pentad," there are ten possibilities: mmmm, mmmr, rmmr, mmrr, mrmm, rmrr, mrmr, rrrr, rrrr, and mrrm. A completely syndiotactic polymer would have all rrrr pentads, while a completely isotactic polymer would have all mmmm pentads. The configuration can be determined by $^{13}C$ nuclear magnetic resonance spectroscopy as described in Macromolecules 8 687 (1975) and in Macromolecules 6 925 (1973) and references cited therein. For more information on polymer stereochemistry, see G. Odian, Principles of Polymerization, 2nd edition, pages 568-580 (1981).

Propylene based polymers can be produced using the process of this invention at various levels of tacticity. Examples of such polymers include atactic polypropylene, isotactic polypropylene, hemi-isotactic and syndiotactic polypropylene or mixtures thereof produced by using two or more different catalysts in the practice of this invention. Other propylene polymers include propylene block or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

In one embodiment of the invention, the polymer is polypropylene that is highly isotactic, readily forms a crystalline structure and has excellent chemical and heat resistance. In another embodiment, the polypropylene made by the process of the invention is highly syndiotactic. In yet another embodiment, the polypropylene made by the process of the invention is characterized in that it has low levels of isotacticity and/or low levels of syndiotacticity. In a particular embodiment, the percent of pentads having mmmm configuration is less than 40%, preferably more than 2%, and more preferably less than 30%. In yet another particular embodiment, the percent of pentads having rrrr is less than 75%, preferably more than 5% and more preferably less than 50%. At lower levels of syndiotacticity and isotacticity, the polymer is predominantly or even completely amorphous, generally has no melting point, is generally transparent and flexible, and has good elastic properties.

H. Polymer Blends

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

I. Appearance

The films produced using the polymers of this invention have good appearance properties. In one embodiment, the films have a low gel content and/or have good haze and gloss. In a preferred embodiment, a 1 mil (1.0 mil=0.25 μm) film is produced that has a 45° gloss of 7 or more, preferably 8 or more, as measured by ASTM D 2475. In a preferred embodiment the 1 mil film (1.0 mil=25 μm) has a haze of 75 of less, preferably 70 or less as measured by ASTM D 1003, condition A.

J. Articles

Polymers produced by the process of the invention and blends thereof are useful in producing any variety of articles. For example, the polymers are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

In another embodiment, the polymer of the invention is made into a film by methods known in the art. For film applications, the polymers of the invention have an $I_{21}$ value of from about 2 to about 100 dg/min, preferably from about 2 to about 50 dg/min, and more preferably from about 2 to about 30 dg/min. $I_{21}$ is measured by ASTM Method D 1238.

In another embodiment, the polymer of the invention is made into a molded article by methods known in the art, for example, by blow molding and injection-stretch molding. For molded applications, the polymers of the invention have a $I_{21}$ of from about 20 dg/min to about 50 dg/min and preferably from about 35 dg/min to about 45 dg/min.

In another embodiment, the polymer of the invention is made into a pipe by methods known in the art. For pipe applications, the polymers of the invention have a $I_{21}$ of from about 2 to about 10 dg/min and preferably from about 2 to about 8 dg/min. In another embodiment, the pipe of the invention satisfies ISO qualifications. In another embodiment, the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

In another embodiment, the polymer has an extrusion rate of greater than about 17 lbs/hour/inch of die circumference and preferably greater than about 20 lbs/hour/inch of die circumference and more preferably greater than about 22 lbs/hour/inch of die circumference.

The objects produced (such as films, pipes, etc) may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

VIII. Product Recovery

Polymer product that leaves the reactor unit of the reaction system contains entrained and or dissolved material that should be separated from the polymer. (For ease of reference whenever entrained materials are referred to, the term also includes dissolved materials.) Included in this polymer product are unreacted monomers and undesirable hydrocarbon by-products of the reaction process. Also included are any diluent and/or solvent materials that are not reactive to form desirable polymer, and may be especially problematic with regard to removal and/or recovery.

A substantial portion (i.e., a majority) of the polymer product is separated from the non-polymer product by sending product effluent from the polymer reactor to a polymer recovery system. The polymer recovery system is operated by controlling a variety of parameters including temperature, pressure, vapor-liquid separation systems, and purge systems or vessels.

In one embodiment, the polymer recovery system incorporates the use of an inert gas to purge or scrub out undesirable entrained material from the polymer product. The inert gas is a composition that is substantially non-reactive with the polymer product, and can be used in sufficient quantity as a driving force to separate the non-polymer components from the polymer product. Examples of useful inert gases include air, nitrogen, water vapor, methane, ethane, and carbon dioxide.

In a particular embodiment, polymer associated with entrained materials such as unreacted monomer, hydrocarbon by-product and diluent such as hydrofluorocarbon is recovered from a polymerization reaction process and sent to a polymer recovery system. Preferably, the polymer recovery system includes a purge system or vessel, more preferably a purge bin, and the polymer and associated entrained materials are sent to the purge system. The inert gas composition is then input into the purge system to purge or drive out the entrained materials, thereby forming a purge stream, which is recovered from the purge system.

Entrained, non-polymer product material that is separated and recovered as a purge stream from the polymer product is preferably further separated into component fractions or a plurality of streams and each fraction or stream stored, recycled or removed as a waste stream from the system as appropriate. It is preferred that diluent and unreacted monomer be separated and returned to the reactor. These streams can be separated and recovered as individual streams or as a combined stream. If in inert gas is used in the recovery system, it is preferred that the inert gas also be separated, preferably as an individual stream, and recovered for reuse in the polymer recovery system and/or in the reaction portion of the polymerization system.

Separation of the purge stream into a plurality of streams, and recovery of those streams, can be accomplished by use of one or more separation systems. In one embodiment, a mix of polymer, catalyst, unreacted monomer, diluent and hydrocarbon by-product from the polymerization reaction are purged with inert gas, and a polymer product stream and a purge gas stream are formed. From the purge gas stream a plurality of streams, including a hydrofluorocarbon containing stream, a nitrogen containing stream and a waste stream are recovered using the one or more separation systems, preferably a condensation system and one or more of a distillation system or barrier separation system.

A portion of the material that is entrained with the polymer effluent from the polymer reactor will be undesirable hydrocarbon by-products that should be vented from the system as a waste stream. Such undesirable hydrocarbon by-products include ethane, butane, hexane, octane, and non-reactice internal olefins such as cis and trans 2-hexene, 3-hexene, etc.

In one embodiment, the waste stream is vented by sending at least a portion of the waste stream to a flare system. In such an embodiment, the waste stream is low in non-combustible components as well as in material that gives undesirable combustion products.

In one embodiment, the waste stream that is vented or flared is low in diluent material, particularly HFC diluent material. If the stream is too high in diluents such as HFC, then flaring the material will problems of environmental emissions (and potential corrosion in the flare system) due to the formation of HF, which can occur at the elevated temperatures associated with the combustion. These problems can be effectively controlled by limiting rate of diluent material that is flared. Since the rate of the diluent will vary according to the rate of flow of total material to the reactor unit, one way to effectively control diluent vent rate is to limit the amount of diluent sent to the vent or flare system relative to the total rate of material that is sent to the polymerization reactor, which is defined herein as unit production flow rate (calculated on a weight to weight basis). Preferably, the waste stream, which contains HFC diluent material to be flared, is sent to the flare system at a hydrofluorocarbon flow rate to unit production flow rate of not greater than 0.1:1, preferably not greater than 0.01:1, more preferably not greater than 0.001:1.

In another embodiment, the waste stream that is vented or flared is low in content in inert gas that is used to scrub the polymer in the purge system. It is particularly desired to have a low concentration of inert gas that is non-combustible. Otherwise, purge gas that is sent to the flare system will adversely affect the flare system. In some cases, however, it will be effective to add a combustible gas to the purge stream in order to effect better burning of the stream. This is particularly effective when the total volume of waste gas is low. In such case, only low volumes of combustible gas will need to be added.

In one embodiment, the waste stream is sent to the flare system with a contained flow rate of inert gas (nitrogen) that is not greater than 6% of unit production rate, on a weight to weight basis. Preferably, the contained flow rate of inert gas is not greater than 3% of unit production rate, more preferably not greater than 1% of unit production rate, and most preferably not greater than 0.5% unit production rate on a weight to weight basis.

One of the benefits of this invention is that the volumetric flow of waste material to vent or flare is substantially reduced over conventional systems. Since the volume of the waste stream that is flared is generally low, it is generally easier to maintain the desired heat content of the waste stream that is to be flared. In one embodiment, the heat content of the waste stream that is vented or flared stream is at least 300 BTU/scf (11,200 kJ/scm), preferably at least 400 BTU/scf (14,900 kJ/scm). In cases where the heat content is less than desired, combustible hydrocarbon material is optionally added to increase the BTU content prior to entering the flare system. Examples of such combustible materials include natural gas, methane, and ethane.

In one embodiment, the waste stream that is to be vented or flared is preferably high in combustible alkyl hydrocarbons. Examples of preferred combustible alkyl hydrocarbons according to this invention include $C_1$ to $C_8$ alkyls, preferably one or more of methane, ethane, propane, linear or branched butanes, linear or branched pentanes, linear or branched hexanes, linear or branched heptanes, and linear or branched octanes. It is preferred that the stream that is to be vented contain at total of at least 5 wt % $C_1$ to $C_8$ alkyl hydrocarbons, preferably 5 to 15 wt %., and more preferably at least 20 wt %.

Another benefit of the product recovery system of this invention is that recovery of inert streams such as nitrogen are provided. Such recovered streams can be reused to separate the non-polymer product from the from the polymer product in the purge system. In one embodiment, a nitrogen rich stream is separated and recovered. Preferably, the nitrogen stream is separated from the hydrocarbon by-products prior to flaring. The separated nitrogen stream preferably contains at least 50 mole % nitrogen, more preferably at least 60 mole % nitrogen, and most preferably at least 70 mole % nitrogen, based on total composition of the separated stream.

An example of how polymer and entrained material are separated and recovered is shown in the polymer recovery system of FIG. 1. According to the system shown in FIG. 1, polymer that contains entrained, unreacted monomer, HFC, as well as undesirable hydrocarbon by-products from the polymerization reaction, is sent to a purge bin 100 through a line 102. Nitrogen purge gas is sent to the purge bin 100 through a line 104 to scrub the polymer and remove the various entrained hydrocarbon materials.

The scrubbed polymer product is removed from the purge bin 100 through a line 105, and the purge gas and entrained hydrocarbon materials are removed from the purge bin 100 through a line 106 as a purge stream. The purge stream is sent to a component separation system 108, where the components are separated into a plurality of streams.

A nitrogen rich stream is removed from the separation system 108 through a line 110. The nitrogen rich stream can be recycled and sent to line 104 or it can be used in any other desirable portion of the polymer reaction or recovery system.

The entrained monomer and HFC hydrocarbons are removed from the separation system through one or more lines from the separation system 108. In the embodiment shown in FIG. 1, the monomer and HFC are removed in a single line, but these components can be further separated as desired. It is preferred that the monomer and HFC be sent back to the polymer reactor and that little to no monomer or HFC be vented or flared. Venting or flaring of HFC is particularly not desired in order to minimize system corrosion or environmental emissions. It is particularly desired to limit the amount of HFC going to the flare system as combustion of the HFC material will tend to form hydrofluoric acid and lead to corrosion as well as other environmental problems.

The material that is to be vented or flared is recovered by way of line 114 as a waste stream. In the embodiment shown in FIG. 1, the waste stream is sent from line 114 to a flare system 116. When the combustible hydrocarbon content or heat value of the waste stream going to the flare system 116 through line 114 is low, additional hydrocarbon (e.g., natural gas) is added to the line 114 through a line 118.

The separation system 108 can include any type of separation device capable of separating the desired components in the purge stream that is recovered from the treated polymer product. Examples of such devices include those capable of performing the one or more of the following processes: compression, flashing, cooling, condensation, distillation, absorption or adsorption.

In one embodiment the purge stream that is to be separated into component streams is sent to a condenser. The condenser is operated at appropriate temperature and pressure conditions that condenses at least 50 wt % of the hydrocarbon (including HFC) in the purge stream, preferably at least 60 wt %, more preferably at least 70 wt %.

In one embodiment, the purge stream is compressed to condense the hydrocarbon material. The condensed hydrocarbon material will typically be separated into at least two streams. One stream is generally a lighter vapor stream and another condensed stream is generally a heavier liquid stream. The heavier condensed stream is preferably sent to the polymer reactor, as it will contain significant quantities of monomer and/or diluent that would be desirable to reuse in the polymerization process. At least a portion of the lighter condensed stream is vented or flared, as it will contain undesirable hydrocarbon compounds (such as ethane) that are not to be returned to the polymer reactor.

In one embodiment, the condenser is operated at a pressure of from 15 psig (103 kPa) to about 10,000 psig (69 MPa). Preferably, the condenser is operated at a pressure of from 20 psig (138 kPa) to about 1000 psig (7 MPa), more preferably from 25 psig (172 kPa) to about 500 psig (3 kPa).

In another embodiment, the condenser is operated at a temperature of from −60° C. to 30° C., preferably −20° C. to 10° C.

In one embodiment, a portion of the lighter condensed stream is vented or flared. In a preferred embodiment, the lighter condensed stream is separated into a hydrofluorocarbon containing stream, a waste stream, and an optional inert or nitrogen stream. Then the waste stream is flared.

The lighter condensed stream can be separated into the hydrofluorcarbon containing stream, the waste stream and optional nitrogen stream by any means suitable for such separation. Preferred methods of separation include further compression, flashing and distillation, as well as vapor-liquid scrubbing and separation by selective barrier. Examples of selective barriers include membrane separation and separation by pressure swing absorption.

Membranes suitable for use in this invention include selectively permeable membranes. Such membranes exhibit substantially different permeability for the various components that are desired to be separated. In one embodiment, the membrane exhibits a substantially different permeability for the monomer material in the stream relative to the HFC and/or inert purge gas or nitrogen. In another embodiment, the membrane exhibits a substantially different permeability for the HFC material in the stream relative to the monomer and/or inert purge gas or nitrogen. In another embodiment, the membrane exhibits a substantially different permeability for the inert purge gas or nitrogen material in the stream relative to the monomer and/or HFC.

In one embodiment, the membrane or membranes useful in this invention are elastomeric membranes, which can be made from a variety of polymers. Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

In another embodiment, the membrane or membranes useful in this invention are glassy membranes, which can be made from a variety of polymers. Examples of polymers that can be used to make glassy membranes include, polysulfones, polyimides, polyamides, polyaramides, polyphenylene oxide, polycarbonates, ethylcellulose or cellulose acetate.

Super-glassy membranes can also be used in this invention. Super-glassy polymers have a rigid structure, high glass transition temperatures, typically above 100° C., 200° C. or higher, and would normally be expected to be selective for smaller, less condensable molecules over larger, more condensable molecules. However, membranes made from certain of these polymers that have unusually high free volume within the polymer material have been found to exhibit anomalous behavior, in that they preferentially permeate larger, more condensable molecules over smaller, less condensable molecules. One particular super-glassy polymer is poly(trimethylsilylpropyne), the use of which to preferentially separate condensable components from lower-boiling, less condensable components is described in U.S. Pat. No. 5,281,255, for example.

The membrane may be in the form of a homogeneous film, an integral asymmetric membrane, a multilayer composite membrane, a membrane incorporating a gel or liquid layer or particulates, or any other form known in the art. In one embodiment, the membrane is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

In one embodiment, the membranes have a selectivity for the faster-permeating component over the other components of at least about 5, more preferably at least about 10 and most preferably at least about 20, and a pressure-normalized flux of the faster-permeating component of at least about $1\times10^{-6}$ cm$^3$ (STP)/cm$^2\cdot$sec$\cdot$cmHg, more preferably at least about $1\times10^{-5}$ cm$^3$ (STP)/cm$^2\cdot$sec$\cdot$cmHg.

The membrane separation system can be operated as a single membrane system or a multi-membrane system. Typically, no driving force beyond a compressor in the condenser unit is needed to run the membrane unit.

In one embodiment, the membrane separation system is a single-stage membrane separation operation using a membrane with a selectivity of about 20. Such a membrane system is capable of removing up to about 80 or 90% of the preferentially permeating component from the feed stream and produce a permeate stream that has five times or more the concentration of that component of the feed gas. Multistage or multistep processes, and variants thereof, can also be used. Such systems are familiar to those of skill in the art, may be configured in many possible ways, including single-stage, multistage, multistep, or more complicated arrays of two or more units in series or cascade arrangements.

In one embodiment, the membrane separation step uses a membrane that is organic-selective, that is, is selective for the monomer over the nitrogen purge gas and HFC. Preferably, such a membrane has a reasonably good selectivity for the monomer over the purge gas and HFC, such as about 10 or more. Removal of monomer from the membrane feed into the permeate is reasonably high, such as about 50%, 80%, 90% or more. Generally, the membrane residue and permeate streams may typically be 5° C., 10° C. or more colder than the feed to the membrane unit, and it may be both convenient and beneficial to use one or both cold streams from the membrane separation step to provide or supplement cooling for the condensation step.

Pressure swing adsorption (PSA) processes provide an efficient and economical means for separating a multi-component gas stream containing at least two gases having different adsorption characteristics. The more strongly adsorbed gas can be an impurity which is removed from the less strongly adsorbed gas which is taken off as product, or, the more strongly adsorbed gas can be the desired product which is separated from the less strongly adsorbed gas.

In PSA processes, a multi component gas, such as the purge stream of this invention, is typically passed to at least one of a plurality of adsorption zones at an elevated pressure effective to adsorb at least one component, i.e. the more strongly adsorbed components, while at least one other component passes through, i.e. the less strongly adsorbed components. At a defined time, the passing of feedstream to the adsorber is terminated and the adsorption zone is depressurized by one or more cocurrent depressurization steps wherein the pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure in the adsorption zone is further reduced by withdrawing desorbed gas countercurrently to the direction of the feedstream. Finally, the adsorption zone is purged and repressurized.

The more strongly adsorbed components are removed from the adsorber bed by countercurrently depressurizing the adsorber bed to a desorption pressure. In general, lower desorption pressures are preferred in order to provide more complete removal of the adsorbate during the desorption step. In addition, lower desorption pressures can provide a greater capacity differential between adsorption and desorption conditions and thus increase the capacity of the process. In another embodiment of this invention rapid swing pressure adsorption is used to remove the fluorocarbon. Rapid pressure swing adsorption (RCPSA) is distinguished from conventional pressure swing adsorption (PSA) by the shorter cycle time it employs. For example, RCPSA cycle times are typically less than a minute while conventional PSA cycle times are generally greater than 4 minutes. With its shorter cycle time, RCPSA offers the advantages of smaller equipment size and lower cost. The principals of operation are similar for both methods, but the hardware (valving, piping, configuration of vessels, etc.) required to perform the cycles differs considerably between the two methods. While conventional PSA is currently in widespread use in refineries and chemical production plants for recovery and separation of gases such as hydrogen, RCPSA is currently in widespread use only for air separation. However, application of RCPSA for hydrogen purification in refineries has recently been disclosed in application (U.S. Ser. No. 60/645,713, filed Jan. 21, 2005).

The invention can be carried out using virtually any adsorbent material in the adsorber beds that has capacity for the adsorbate components. Suitable adsorbents known in the art and commercially available include crystalline molecular sieves, activated carbons, activated clays, silica gels, activated aluminas and the like. The molecular sieves include, for example, the various forms of silicoaluminophosphates and aluminophosphates disclosed in U.S. Pat. Nos. 4,440,871; 4,310,440 and 4,567,027, hereby incorporated by reference as well as zeolitic molecular sieves.

Zeolitic molecular sieves in the calcined form may be represented by the general formula;

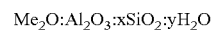

where Me is a cation, x has a value from about 2 to infinity, n is the cation valence and y has a value of from about 2 to 10.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicate disclosed in U.S. Pat. No. 4,073,865, hereby incorporated by reference. Detailed descriptions of some of the above-identified zeolites may be found in D. W. Breck, *Zeolite Molecular Sieves*, John Wiley and Sons, New York, 1974, hereby incorporated by reference. The selection of a particular adsorbent for a particular separation can be made by one skilled in the art with routine experimentation and need not be further discussed herein.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silica thorias, silica-berylias, silica-titanias, silica-aluminas-thorias, silica-alumina-zirconias, mixtures of these and the like, clay-type binders are preferred. Examples of clays which may be employed to agglomerate the molecular sieve without substantially altering the absorptive properties of the zeolite are attapulgite, kaolin, volclay, sepiolite, polygorskite, kaolinite, bentonite, montmorillonite, illite and chlorite. The choice of a suitable binder and methods employed to agglomerate the molecular sieves are generally known to those skilled in the art and need not be further described herein.

A PSA operation cycle useful in this invention includes the well known cycle steps of adsorption, one or more equalization steps, countercurrent desorption, purge and repressurization. The cycle steps are typically described with reference to their direction relative to the adsorption step. Thus cycle steps wherein the gas flow is in a concurrent direction to the adsorption step are known as "cocurrent" steps. Similarly cycle steps wherein the gas flow is countercurrent to the adsorption step are known as "countercurrent" steps. During the adsorption step the feedstream is passed to the adsorber bed at an elevated adsorption pressure in order to cause the adsorption of the adsorbate and provide a product stream enriched in the first component relative to the feedstream. During the equalization steps the pressure in the depressurizing bed is released preferably cocurrently and the effluent obtained therefrom, which is preferably rich in the first component, is passed in a countercurrent direction to another absorber undergoing repressurization. Typically at the conclusion of the equalization steps a provide purge step is initiated wherein the adsorber bed is further cocurrently depressurized to provide a purge gas that is relatively impure with respect to the first component and thus is suitable for use as a purge gas. Optionally, instead of the provide purge step a portion of the product gas or gas obtained from one of the equalization steps can be used to supply the purge gas. Upon completion of the provide purge step, if employed, the adsorber bed is countercurrently depressurized to a desorption pressure in order to desorb the adsorbate. Upon completion of the desorption step the adsorber bed is purged countercurrently with purge gas obtained from another adsorber bed. Finally the adsorber bed is repressurized, first, with equalization gas from other adsorber beds and then with feed or product gas to adsorption pressure. Other additional steps known to those skilled in the art, such as for example, a copurge step wherein the adsorber bed is cocurrently purged at an elevated pressure such as the adsorption pressure with a purge stream comprising the adsorbate, can be employed.

Any flare apparatus or system capable of combusting the hydrocarbon components of the purge gas stream of this invention can be used to combust the waste stream recovered according to this invention. Such a system may include one or more flare stacks, and not only dispose of the waste stream during normal operation but also can be utilized to dispose flammable waste gases or other flammable gas streams, which are diverted during venting, shut-downs, upsets and/or emergencies.

Flaring of waste streams without producing smoke is preferred. In one embodiment, the production of smoke is reduced by burning the waste stream in the presence of air and steam. In another embodiment, the production of smoke is reduced by burning the waste stream in the presence of air only. In such an embodiment, the waste stream is intimately mixed with the air to fully oxide the hydrocarbon components.

In another embodiment, the hydrocarbon components of the waste stream are combusted with the use of regenerative thermal oxidizers (RTOs). In an RTO unit, the waste stream is generally cycled through a first chamber containing packing elements that have previously been heated and then enters a combustion chamber where the combustible or pyrolyzable materials in the waste stream are burned. The effluent is passed through a second chamber containing packing elements. These elements absorb at least some of the heat from the effluent gases before they are discharged to the atmosphere. When the elements have reached an elevated temperature such that heat transfer no longer occurs efficiently, the flow direction is reversed and the second chamber becomes the first chamber and vice versa.

The packing elements in the chambers of an RTO can be in the form of monoliths with a plurality of through passages that are stacked within the chamber to provide a plurality of rectilinear parallel passages through which the gas can flow on its way through the chamber. Alternatively, the elements are dumped in random fashion within the chamber so as to provide a large number of non-rectilinear routes through the chamber for the waste stream. The individual elements can have a wide range of sizes and shapes such as hollow cylinders, with and without internal septa or other internal structures, cylinders with triangular or "bow-tie" cross-sections, and porous pellets.

Waste streams that are particularly suitable for treatment using RTOs may be generated for example when gas flows containing combustible materials that include a small quantity of halohydrocarbons. In such applications, it is preferred that the elements used in the RTO are capable of absorbing heat rapidly and are stable under thermal cycling conditions.

Typical packing elements for RTO applications are made from clay/feldspathic material mixtures that have good stability to thermal cycling while having a good capacity to absorb heat. It is preferred the packing elements are resistant to attack by the halogen-containing components that may be in the waste stream. In a preferred embodiment, the packing elements include a ceramic packing element having an alkali metal content that is not greater than 0.25% by weight, formed from a fired mixture comprising 10 to 98%, and preferably from 35 to 65%, by weight of a clay having an alumina content of at least 36% by weight; from 2 to 90%, and preferably from 35 to 80%, by weight of a talc containing at least 95% by weight of magnesium silicate as determined by X-ray diffraction analysis; and from 0 to 10%, preferably from 3 to 7%, of a dolomitic limestone containing at least 60 to 90% by weight of calcium carbonate and at least 10% and preferably 40 to 10%, by weight of magnesium carbonate and less than 10% of non-carbonate impurities. Such packing elements are described in greater detail in U.S. Pat. No. 6,605,557, which is incorporated herein by reference.

Figure 2:
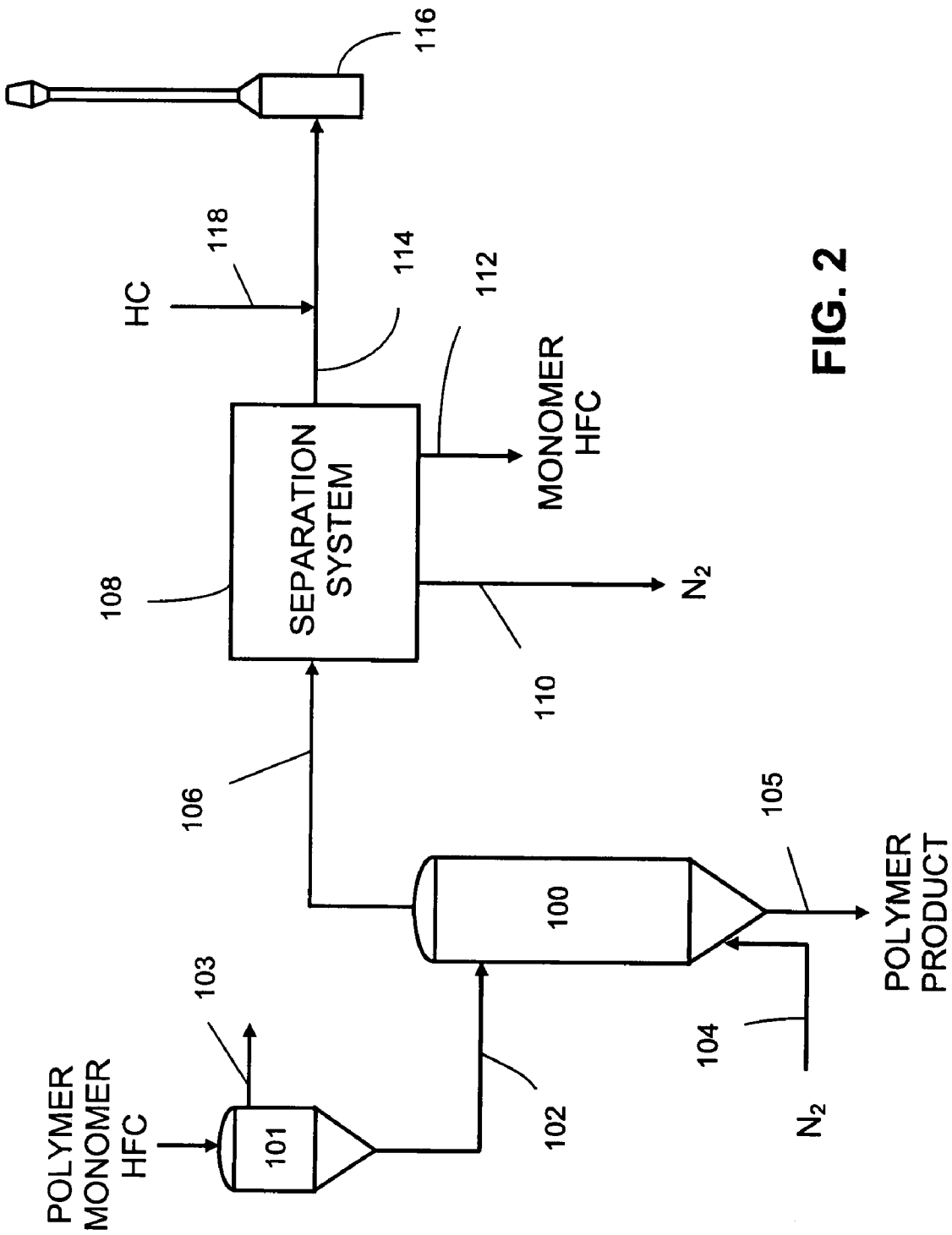
FIG. 2 is a generic flow diagram of the polymer recovery system of this invention that includes a flash tank.

A preferred embodiment of the invention is shown in FIG. 2. The embodiment of FIG. 2 is the same as that shown in FIG. 1, except that polymer that contains the entrained hydrocarbon and HFC material is first sent to a flash tank 101. In the flash tank 101, the pressure is reduced causing the more volatile components to vaporize. The vaporized components are removed from the flash tank 101 by a line 103, and the polymer and non-vaporized components are sent to the purge bin 100 by way of the line 102.

Figure 3:
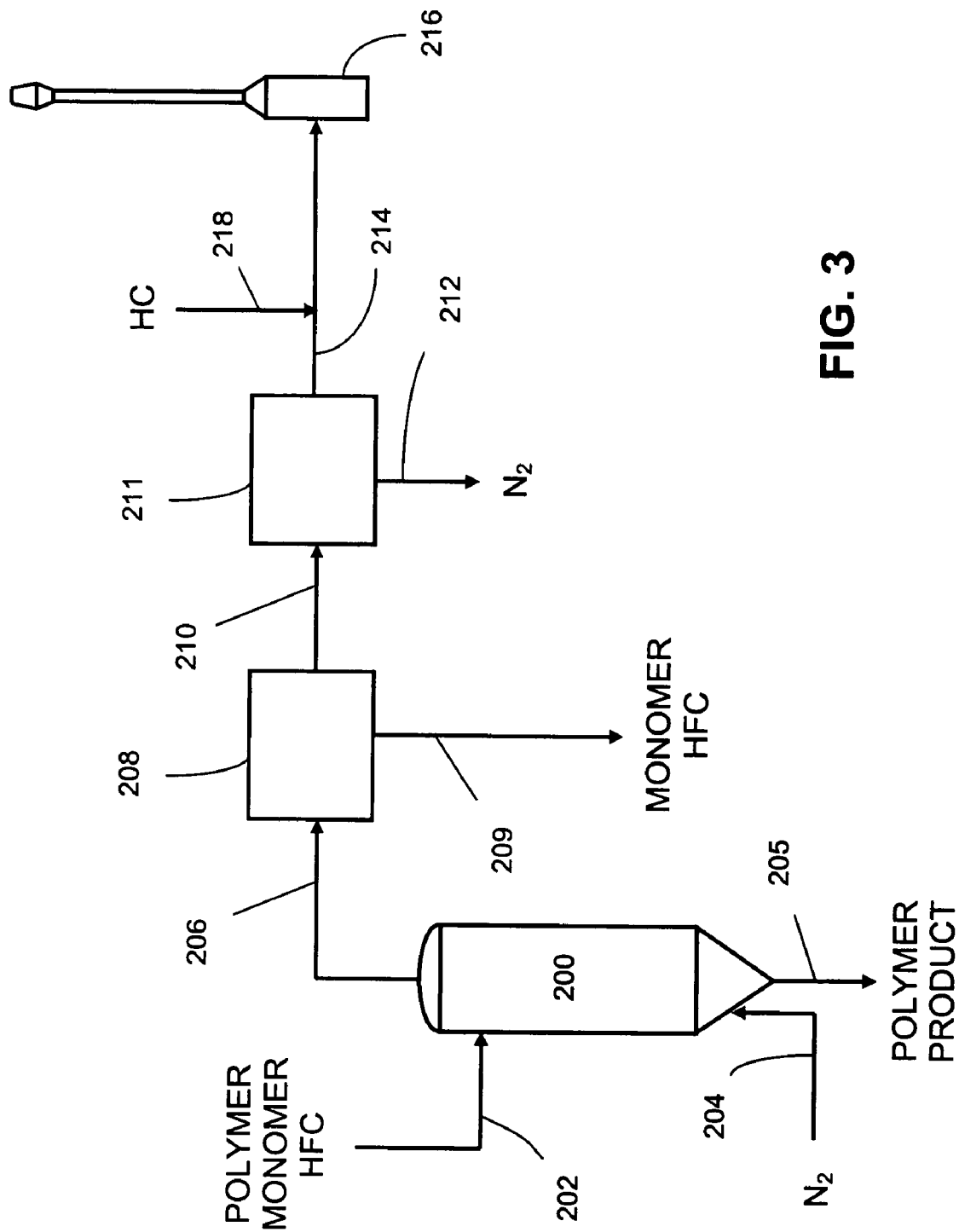
FIG. 3 is a flow diagram of one embodiment of the invention that uses a first and second separation to first recover a hydrocarbon rich stream and then a nitrogen rich stream.

Another example of a polymer product recovery system of this invention is shown in FIG. 3. This particular embodiment, incorporates the use of a first and second separation system to recover a plurality of streams that are either reused in the polymerization system or discarded as a waste stream to a flare system.

According to the embodiment shown in FIG. 3, polymer that contains unreacted monomer, HFC, as well as other entrained hydrocarbons, including undesirable hydrocarbon by-products from the polymerization reaction, is sent to a purge bin 200 through a line 202. Nitrogen purge gas is sent to the purge bin 200 through a line 204 to scrub the polymer and remove the various entrained hydrocarbon materials.

The scrubbed polymer, also referred to as a degassed polymer product, is removed from the purge bin 200 by way of a line 205. The purge stream, which contains the nitrogen purge gas and hydrocarbon materials scrubbed from the polymer are recovered from the purge bin 200 and sent through a line 206 to a first separation system 208. The separation system 208 separates the purge stream into a hydrofluorocarbon containing stream and nitrogen containing stream. The hydrofluorocarbon containing stream, which contains a majority of the unreacted monomer and HFC sent to the purge bin 200, is removed from the first separation system 208 by way of a line 209. The nitrogen containing stream, which contains a majority of the nitrogen in the purge stream, is removed from the first separation system 208 by way of a line 210.

The nitrogen containing stream that is removed from the first separation system 208, is sent to through the line 210 to a second separation system 211. The second separation system 211 separates the nitrogen stream into a nitrogen rich stream and a waste stream. The nitrogen rich stream, which contains a majority of the nitrogen from the nitrogen stream in the line 210, is recovered from the second separation system 211 by way of a line 212.

The waste stream, which is also considered as a nitrogen lean stream, is sent through a line 214 to a flare system 216. In cases where the waste gas is low in volume or heat content, additional hydrocarbon (e.g., natural gas) is injected into the line 214 through a line 218.

Figure 4:
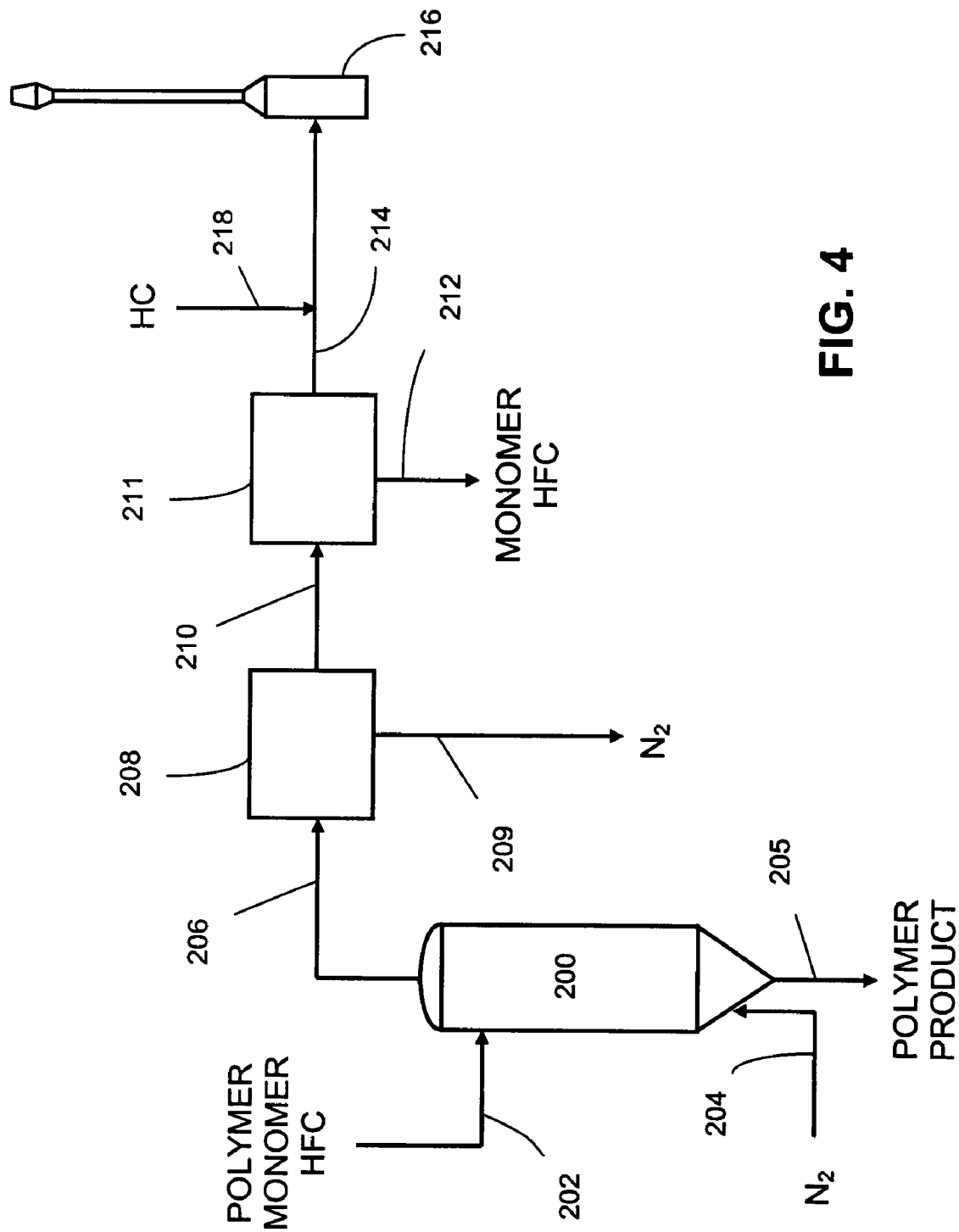
FIG. 4 is a flow diagram of one embodiment of the invention that uses a first and second separation to first recover a nitrogen rich stream and then a hydrocarbon rich stream.

An alternative embodiment of FIG. 3 is shown in FIG. 4. The embodiment in FIG. 4 is the same as FIG. 3, except that the nitrogen rich stream is separated in the first reaction system 208 and removed through the line 209. In addition, the hydrocarbon rich stream, containing the majority of the unreacted monomer and HFC, is separated in the second reaction system 211 and removed through the line 212.

Figure 5:
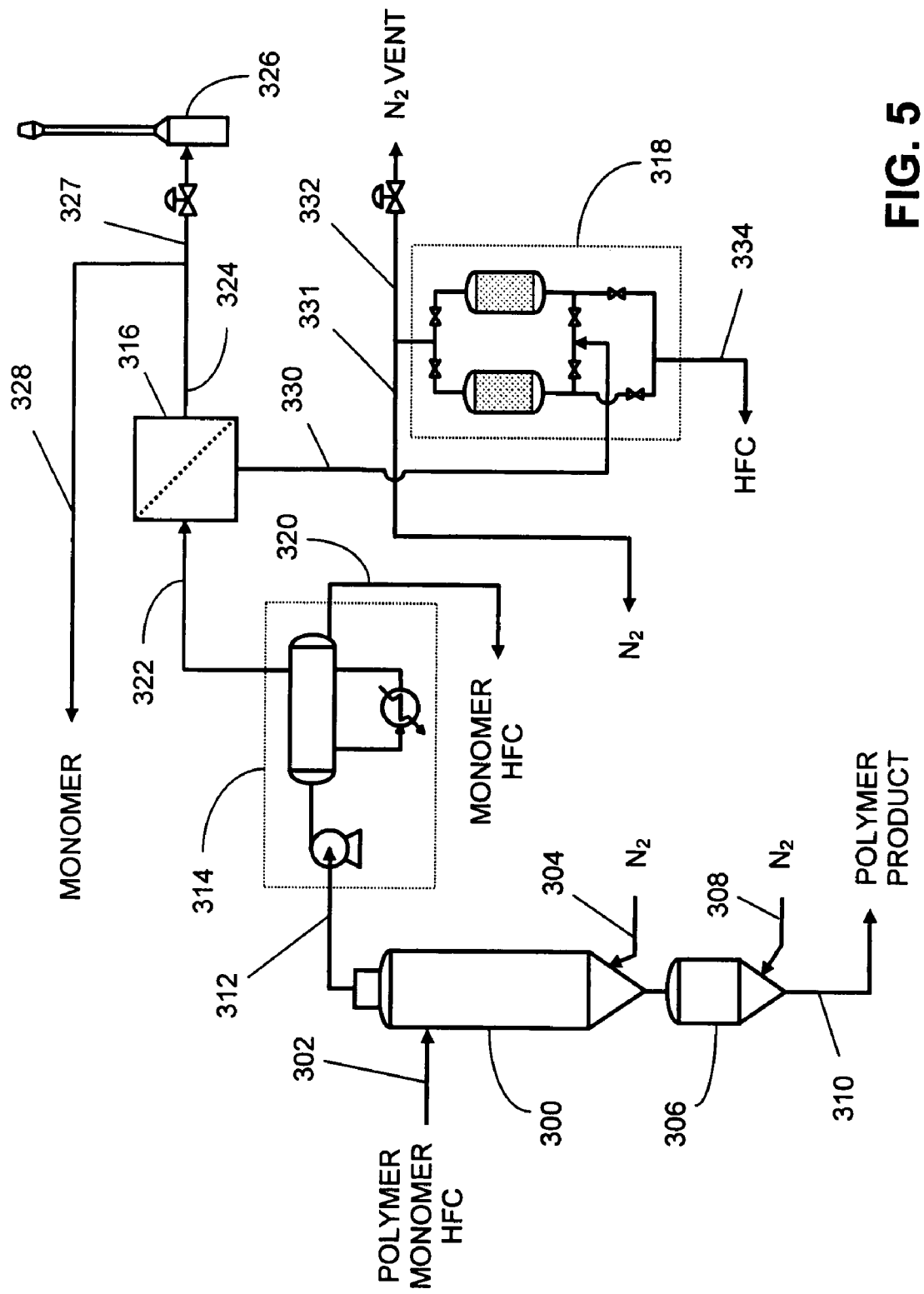
FIG. 5 is a flow diagram of one embodiment of the invention that includes a condensation system and a barrier separation system.

A greater detail of one example of a polymer product recovery system of this invention is shown in FIG. 5. This particular embodiment, incorporates the use of a selective barrier system as part of the separation system to separate components, and a flare system to combust unreuseable hydrocarbon separated from the polymer. According to the embodiment shown in FIG. 5, polymer that contains ureacted monomer, HFC, and other hydrocarbons, including undesirable hydrocarbon by-products from the polymerization reaction, is sent to a purge bin 300 through a line 302. Nitrogen purge gas is sent to the purge bin 300 through a line 304 to scrub the polymer and remove the various hydrocarbon material.

The scrubbed polymer, also referred to as a degassed polymer product, is sent to a secondary purge tank 306, wherein additional nitrogen purge gas is injected through a line 308 to additionally scrub unreacted monomer, HFC and other entrained hydrocarbon from the polymer. Polymer product is removed from the secondary purge tank 306 through a line 310.

Nitrogen purge gas, monomer, HFC and other entrained hydrocarbons are removed from the purge bin 300 as a purge stream by way of a line 312, and the purge stream is sent to a separation system, which is comprised of a condenser system 314 and a selective barrier system. The selective barrier system includes both a membrane system 316 and a pressure swing adsorption (PSA) system 318 in the particular embodiment shown in FIG. 5.

In the embodiment shown in FIG. 5, the condenser system includes a compressor, settler drum and heat exchanger. The condenser system 314 is operated as a conventional system in that the material sent to the system is compressed, cooled and separated into various components according to the respective boiling point ranges. In the FIG. 5, embodiment, a majority of the monomer and HFC are condensed and separated as a liquid stream by way of a line 320. This liquid stream can be further separated into component parts, for example by distillation, or reused in the polymerization system, for example sent back to the reactor system.

Higher boiling point components are removed from the compressor system by way of a line 322. The stream flowing through line 322 is a nitrogen rich line, and contains a majority of the nitrogen sent to the condenser system 314.

The nitrogen rich stream in line 322 is sent to the membrane system 316 to separate a nitrogen containing stream from the HFC, monomer, and/or other entrained hydrocarbon components. The membrane can be selected according to the particular separation desired. In the embodiment shown in FIG. 5, a substantial portion of the monomer and/or HC components are separated and sent through a line 324. If the stream flowing through line 324 contains a substantial portion of hydrocarbon components not particularly useful or desirable in the polymerization system, the components are sent to a flare system 326 via line 327 as a waste stream. If the stream flowing through the line 324 contains a substantial portion of useful monomer or other hydrocarbons useful in the polymerization system, then the stream can be sent to a line 328 back to the polymerization system.

The nitrogen containing stream leaving the membrane system 316 is passed through a line 330 to the PSA system 318, which, in the FIG. 5 embodiment, is operated as a conventional two vessel, back-flush system. A stream high in nitrogen content exits the PSA system 318 and is sent either through a line 331 or 332. The high nitrogen content stream can be vented to atmosphere through the line 332, but is preferably reused in the polymerization or recovery system, such as by recycling the nitrogen through the line 331 to one or more of the lines 304 and 308.

The HFC rich stream separated in the PSA system 318 is recovered by way of a line 334. The HFC stream is preferably reused in the polymerization system, e.g., recycled to the polymerization reactor. If, however, the HFC stream becomes contaminated or degrades over time, a portion of the stream can be discarded in a manner appropriate to minimize environmental contamination.

In another embodiment, activated carbon is used to remove the fluorocarbon(s) from the hydrocarbon streams and/or the waste streams. When using fluorocarbons in a process (such as a polymerization process) it is useful to prevent the escape of the fluorocarbons to the atmosphere. It is also useful to prevent the passage of fluorocarbons to the flare or other combustion process. Specifically, in some embodiments, activated carbon is used to remove the fluorocarbons from a gas or liquid process stream.

In another embodiment, the activated carbon would be used as the absorbent material in a Pressure Swing Adsorption (PSA) process. A PSA process employs at least two separate adsorption columns. One column operates as the active column, adsorbing material from the flow stream while the other operates off-line (at reduced pressure) in the "regeneration" mode. When the adsorption capacity of the active column is reached, the role of the columns is reversed. The alternating cycles of this process provide an effectively continuous flow path through the system, and a continuous removal of certain components from the flow stream (i.e. those components that are strongly adsorbed by the activated carbon, such as fluorocarbons). In another preferred embodiment, when using the activated carbon for removal of fluorocarbons from a process stream, a PSA system of a given size could operated at a reduced cycle frequency for improved reliability and reduced mechanical wear on the switching valve components as compared to a process stream of hydrocarbons without fluorocarbons. In another preferred embodiment, a PSA system could be designed with smaller sized columns for reduced cost when using the activated carbon for removal of fluorocarbons from a process stream as compared to a process stream of hydrocarbons without fluorocarbon.

In an alternative embodiment, the activated carbon is used as a safety "guard bed" downstream of a primary separation system. The purpose of this guard bed would be to capture any fluorocarbon material that may bypass the primary separation system. In this case, the advantages provided by the activated carbon would be similar to that described above with PSA. The size (and cost) of the guard bed could be reduced significantly.

EXAMPLES

A series of absorption experimental runs were conducted in a simple, lab-scale column to determine the absorption capacity of two different types of activated carbon obtained from a vendor. The absorption capacities were measured with both types of activated carbon using three different types of hydrofluorocarbon (HFC-134a, HFC-236fa, and HFC-245fa). Results of these experiments are shown in Tables I and II.

The absorption column was a ½ inch (1.27 cm) OD stainless steel tubing with valves fitted on either side. The ½ inch (1.27 cm) stainless steel tubing was 9⅞ inches long (25.1 cm) with an internal diameter of 0.430 inch (10.9 mm). The column was packed with one of two types of activated carbon obtained from Calgon Carbon Corporation. The first sample was described by the vendor as "Calgon Activated Carbon, Type AP4-60." The second was described as "Calgon Activated Carbon, Type OVC Plus 4×6." The AP4-60 activated carbon was in the form of cylindrically shaped pellets, while the OVC Plus material was in the form of flakes. Both of these carbons were crushed with a mortar and pestle to a smaller size to fit inside the absorption column. The crushing reduced the average size of the particles or flakes to approximately 25 to 50 percent of their original size, with some fines. Glass wool packing was inserted on both ends of the column (next to the valves) to prevent any carbon from entering in to the valve areas. The HFC-245fa was obtained from Honeywell, as marketed under their trade name Enovate 3000. The HFC-236fa was obtained from DuPont, marketed as SUVA 236fa. The HFC-134a was an automotive grade material, marketed as R-134a. These materials were used as received without purification.

The fluorocarbon was allowed to vaporize or boil from its holding container through a line that led to the bottom of the absorption column. Between the column and the HFC source were two rotameters (flow indicating devices). Each rotameter had a flow range of 50 ml/min of air at 21.1° C. at atmospheric pressure. The rotameters were arranged in parallel to provide a flow range of 100 ml/min of air at atmospheric pressure. (The actual flow range of the rotameter depends on the Mw of the gas. For a gas of known Mw, the actual flow rate can be obtained from the indicated flow rate using methods that are well known in the art.) On the exit side of the absorption column, a ¼ inch (0.64 cm) line was directed down to a coil of stainless steel tubing that was contained within a beaker of dry ice. The chilled coil of stainless steel tubing acted as a condenser to liquefy (and detect) fluorocarbon gas coming from the absorption column. The downstream end of the condenser coil was vented to the atmosphere within a fume hood. Prior to each run, the weight of the empty column (with glass wool and valves) was weighed and recorded as the tare weight. The column was weighed again after the addition of activated carbon. The column was then connected to the feed and exit lines, and fluorocarbon (as a gas) was passed through the adsorption column. The flow rate of fluorocarbon was set at an indicated 25 to 30 ml/min on each rotameter. Initially there was no fluorocarbon condensed in the coil, indicating that the fluorocarbon was being adsorbed by the activated carbon in the column. Flow through the column was continued until some liquid began to "spit" out of the end of the condenser. This indicated that fluorocarbon was no longer being adsorbed by the column, and the limiting adsorption capacity had been reached. The flow of fluorocarbon gas was allowed to continue one more minute to ensure complete saturation, and the flow was then stopped. The valves on either side of the absorption column were closed and then the column removed and weighed. The increase in weight of the absorption column was taken as the weight of fluorocarbon adsorbed. Upon the completion of the run, the valves were removed and the activated carbon was poured out to prepare for the next test. No gas release was observed when opening or removing the valves, indicating that the fluorocarbon initially adsorbed during the tests remained adsorbed on the activated carbon.

TABLE I

Activated Carbon Absorption Results With Fluorocarbon (FC)

| Activated Carbon Type | FC Type | FC Mw (g/mole) | Wt. Empty Tube, w/ valves (g) | Wt. of Tube w/ Carbon (g) |
| --- | --- | --- | --- | --- |
| AP4-60 | HFC-245fa | 134 | 394.30 | 406.42 |
| AP4-60 | R-134a | 102 | 394.45 | 406.74 |
| AP4-60 | HFC-236fa | 152 | 394.41 | 407.14 |

TABLE I-continued

Activated Carbon Absorption Results With Fluorocarbon (FC)

| Activated Carbon Type | FC Type | FC Mw (g/mole) | Wt. Empty Tube, w/ valves (g) | Wt. of Tube w/ Carbon (g) |
|---|---|---|---|---|
| OVC Plus | HFC-236fa | 152 | 394.46 | 405.10 |
| OVC Plus | R-134a | 102 | 394.44 | 405.68 |
| OVC Plus | HFC-245fa | 134 | 394.45 | 405.65 |

TABLE II

| Activated Carbon Type | Wt. Carbon (g) | Wt. of Tube w/ Carbon & FC (g) | Wt. of FC Absorbed (g) | FC/C Ratio by Weight | FC/C Molar Ratio |
|---|---|---|---|---|---|
| AP4-60 | 12.12 | 412.75 | 6.33 | 0.522 | 0.0468 |
| AP4-60 | 12.29 | 410.93 | 4.19 | 0.341 | 0.0401 |
| AP4-60 | 12.73 | 413.81 | 6.67 | 0.524 | 0.0414 |
| OVC Plus | 10.64 | 411.39 | 6.29 | 0.591 | 0.0467 |
| OVC Plus | 11.24 | 410.92 | 5.24 | 0.466 | 0.0549 |
| OVC Plus | 11.20 | 412.39 | 6.74 | 0.602 | 0.0539 |

The above tests indicate that the activated carbon materials had surprisingly high adsorption capacities of between 34 to 60 percent of fluorocarbons by weight as indicated in Tables I and II. Thus in a preferred embodiment, the vent streams from a process could be purified (i.e. fluorocarbon removed) with reduced amounts of activated carbon than would normally be used in an activated carbon bed in a hydrocarbon process.

Having now fully described this invention, it will be appreciated by those skilled in the art that the invention can be performed within a wide range of parameters within what is claimed, without departing from the spirit and scope of the invention. All documents described herein are incorporated by reference herein, including any priority documents and/or testing procedures. Likewise, the term "comprising" is considered synonymous with the term "including" for purposes of Australian law.

The invention claimed is:

1. A process for polymerizing one or more hydrocarbon monomer(s) in a reactor system, the reactor system comprising a reactor and a flare system, the process comprising the steps of:
   a) mixing together a catalyst system, the one or more monomers and a hydrofluorocarbon in the reactor to produce polymer;
   b) recovering from the mixture a plurality of streams, including a hydrofluorocarbon containing stream, a polymer product stream and a waste stream; and
   c) sending at least a portion of the waste stream to the flare system.

2. The process of claim 1, wherein the waste stream is sent to the flare system at a hydrofluorocarbon flow rate to unit production flow rate of not greater than 0.1:1.

3. The process of claim 2, wherein the waste stream is sent to the flare system at a hydrofluorocarbon flow rate to unit production flow rate of not greater than 0.01:1.

4. The process of claim 3, wherein the waste stream is sent to the flare system at a hydrofluorocarbon flow rate to unit production flow rate of not greater than 0.001:1.

5. The process of claim 1, wherein the mixture is purged with a nitrogen stream and then the plurality of streams is recovered.

6. The process of claim 5, wherein the plurality of recovered streams includes a nitrogen containing stream.

7. The process of claim 6, wherein the nitrogen containing stream contains a majority of the nitrogen used to purge the polymer product.

8. The process of claim 5, wherein the waste stream contains nitrogen and is sent to the flare system at a nitrogen flow rate that is not greater than 6% of unit production rate.

9. The process of claim 8, wherein the waste stream is sent to the flare system at a nitrogen flow rate that is not greater than 3% of unit production rate.

10. The process of claim 9, wherein the waste stream is sent to the flare system at a nitrogen flow rate that is not greater than 1% of unit production rate.

11. The process of claim 10, wherein the waste stream is sent to the flare system at a nitrogen flow rate that is not greater than 0.5% unit production rate.

12. The process of claim 1, wherein the plurality of streams is recovered through one or more separation systems comprising compression, flashing, cooling, condensation, distillation, selective barrier separation or a combination thereof.

13. The process of claim 12, wherein the plurality of streams is recovered through condensation and selective barrier separation.

14. The process of claim 1, wherein the polymerization process is a solution process, gas phase process, slurry phase process, medium pressure process, high pressure process or a combination thereof.

15. A polymerization process, comprising the steps of:
   a) forming a polymer in the presence of a hydrofluorocarbon;
   b) recovering a majority of the polymer in a polymer product stream and a majority of the hydrofluorocarbon in a purge stream;
   c) separating the purge stream into a plurality of streams including a hydrofluorocarbon containing stream and a waste stream; and
   d) sending at least a portion of the waste stream to a flare stream.

16. The process of claim 15, wherein the recovered polymer product stream contains not greater than 100 wppm total hydrofluorocarbon, based on total weight of the recovered polymer product stream.

17. The process of claim 15, wherein the waste stream contains hydrofluorocarbon and is sent to the flare system at a hydrofluorocarbon flow rate to unit production flow rate of not greater than 0.1:1.

18. The process of claim 17, wherein the waste stream is sent to the flare system at a hydrofluorocarbon flow rate to unit production flow rate of not greater than 0.01:1.

19. The process of claim 18, wherein the waste stream is sent to the flare system at a hydrofluorocarbon flow rate to unit production flow rate of not greater than 0.001:1.

20. The process of claim 15, wherein the majority of the hydrofluorocarbon is recovered in the purge stream by purging the polymer with nitrogen.

21. The process of claim 20, wherein a nitrogen stream is recovered from the purge stream.

22. The process of claim 21, wherein the waste stream contains nitrogen and is sent to the flare system at a nitrogen flow rate that is not greater than 6% of unit production rate.

23. The process of claim 22, wherein the waste stream is sent to the flare system at a nitrogen flow rate that is not greater than 3% of unit production rate.

24. The process of claim 23, wherein the waste stream is sent to the flare system at a nitrogen flow rate that is not greater than 1% of unit production rate.

25. The process of claim 24, wherein the waste stream is sent to the flare system at a nitrogen flow rate that is not greater than 0.5% unit production rate.

26. The process of claim 21, wherein the recovered nitrogen stream is used to purge the polymer of hydrofluorocarbon.

27. The process of claim 15, wherein the purge stream is separated into a plurality of streams through one or more separation systems comprising compression, flashing, cooling, condensation, distillation, selective barrier separation or a combination thereof.

28. The process of claim 27, wherein the purge stream is separated into a plurality of streams through condensation and selective barrier separation.

29. The process of claim 15, wherein the polymerization process is a solution process, gas phase process, slurry phase process, medium pressure process, high pressure process or a combination thereof.

30. A polymer recovery process, comprising the steps of:
a) separating hydrofluorocarbon from a polymer;
b) recovering the separated hydrofluorocarbon in a purge stream and the polymer in a polymer product stream;
c) separating the purge stream into a plurality of streams including a hydrofluorocarbon containing stream and a waste stream; and
d) sending at least a portion of the waste stream to a flare system.

31. The process of claim 30, wherein the recovered polymer product stream contains not greater than 100 wppm total hydrofluorocarbon, based on total weight of the recovered polymer product stream.

32. The process of claim 30, wherein the waste stream contains hydrofluorocarbon and is sent to the flare system at a hydrofluorocarbon flow rate to unit production flow rate of not greater than 0.1:1.

33. The process of claim 32, wherein the waste stream is sent to the flare system at a hydrofluorocarbon flow rate to unit production flow rate of not greater than 0.01:1.

34. The process of claim 33, wherein the waste stream is sent to the flare system at a hydrofluorocarbon flow rate to unit production flow rate of not greater than 0.001:1.

35. The process of claim 30, wherein the hydrofluorocarbon is recovered in the purge stream by purging the polymer with a nitrogen stream.

36. The process of claim 30, wherein the plurality of streams includes a nitrogen containing stream.

37. The process of claim 36, wherein the waste stream contains nitrogen and is sent to the flare system at a nitrogen flow rate that is not greater than 6% of unit production rate.

38. The process of claim 37, wherein the waste stream is sent to the flare system at a nitrogen flow rate that is not greater than 3% of unit production rate.

39. The process of claim 38, wherein the waste stream is sent to the flare system at a nitrogen flow rate that is not greater than 1% of unit production rate.

40. The process of claim 39, wherein the waste stream is sent to the flare system at a nitrogen flow rate that is not greater than 0.5% unit production rate.

41. The process of claim 35, wherein the nitrogen containing stream is used to separate hydrofluorocarbon from the polymer.

42. The process of claim 30, wherein the purge stream is separated into the plurality of streams through one or more separation systems comprising compression, flashing, cooling, condensation, distillation, selective barrier separation or a combination thereof.

43. The process of claim 42, wherein the purge stream is separated into the plurality of streams through condensation and selective barrier separation.

44. A polymerization process, comprising the steps of:
a) polymerizing at least one monomer to form polymer in a mixture containing hydrofluorocarbon;
b) recovering from the mixture a plurality of streams, including a waste stream; and
c) sending at least a portion of the waste stream to a flare system.

45. The process of claim 44, wherein the waste stream contains hydrofluorocarbon and is sent to the flare system at a hydrofluorocarbon flow rate to unit production flow rate of not greater than 0.1:1.

46. The process of claim 45, wherein the waste stream is sent to the flare system at a hydrofluorocarbon flow rate to unit production flow rate of not greater than 0.01:1.

47. The process of claim 46, wherein the waste stream is sent to the flare system at a hydrofluorocarbon flow rate to unit production flow rate of not greater than 0.001:1.

48. The process of claim 44, wherein the waste stream contains nitrogen and is sent to the flare system at a nitrogen flow rate that is not greater than 6% of unit production rate.

49. The process of claim 48, wherein the waste stream is sent to the flare system at a nitrogen flow rate that is not greater than 3% of unit production rate.

50. The process of claim 49, wherein the waste stream is sent to the flare system at a nitrogen flow rate that is not greater than 1% of unit production rate.

51. The process of claim 50, wherein the waste stream is sent to the flare system at a nitrogen flow rate that is not greater than 0.5% unit production rate.

52. The process of claim 44, wherein the polymerization is a solution process, gas phase process, slurry phase process, medium pressure process, high pressure process or a combination thereof.

53. The process of claim 44, wherein the plurality of streams is recovered by purging the mixture with a nitrogen stream.

54. The process of claim 53, wherein the plurality of streams includes a hydrofluorocarbon containing stream and a nitrogen containing stream.

55. The process of claim 54, wherein the hydrofluorocarbon containing stream contains a majority of the hydrofluorocarbon contained in the mixture.

56. The process of claim 54, wherein the nitrogen containing stream contains a majority of the nitrogen used to purge the mixture.

57. The process of claim 1, wherein the waste stream is passed through activated carbon prior to being sent to the flare.

58. The process of claim 15, wherein the waste stream is passed through activated carbon prior to being sent to the flare.

59. The process of claim 30, wherein the waste stream is passed through activated carbon prior to being sent to the flare.

60. The process of claim 44, wherein the waste stream is passed through activated carbon prior to being sent to the flare.

* * * * *